(12) United States Patent
Filkins et al.

(10) Patent No.: US 12,473,971 B2
(45) Date of Patent: Nov. 18, 2025

(54) OFFSET TRANSFER CASE PUMP WITH LUBRICATION DISTRIBUTION SYSTEM

(71) Applicant: Magna Powertrain of America, Inc., Troy, MI (US)

(72) Inventors: Timothy Filkins, Auburn Hills, MI (US); Douglas Bradley, Sterling Heights, MI (US); Devin Ryman, Macomb, MI (US); Daniel Munoz Cabrera, Col Lomas de Guadalupe (MX); Homero Gomez, Colonia Jardines del Lago (MX)

(73) Assignee: Magna Powertrain of America, Inc.

( * ) Notice: Subject to any disclaimer, the term of this patent is extended or adjusted under 35 U.S.C. 154(b) by 0 days.

(21) Appl. No.: 18/743,294

(22) Filed: Jun. 14, 2024

(65) Prior Publication Data

US 2024/0328505 A1    Oct. 3, 2024

Related U.S. Application Data

(63) Continuation-in-part of application No. 17/897,708, filed on Aug. 29, 2022, now Pat. No. 12,377,804.

(60) Provisional application No. 63/238,265, filed on Aug. 30, 2021.

(51) Int. Cl.
    *F16H 57/04*       (2010.01)
(52) U.S. Cl.
    CPC ..... *F16H 57/0483* (2013.01); *F16H 57/0436* (2013.01); *F16H 57/0454* (2013.01); *F16H 57/0456* (2013.01)

(58) Field of Classification Search
    CPC .......................... F16H 57/0441; F16H 57/0426
    See application file for complete search history.

(56) References Cited

U.S. PATENT DOCUMENTS

| | | | |
|---|---|---|---|
| 4,838,121 A * | 6/1989 | Takeshita ............. | B60K 17/344 475/303 |
| 7,753,173 B2 | 7/2010 | Gratzer et al. | |
| 7,757,816 B2 | 7/2010 | Bar et al. | |
| 7,992,668 B2 * | 8/2011 | Smith ..................... | F16D 3/185 180/245 |
| 9,441,726 B1 * | 9/2016 | Palazzolo ........... | F16H 57/0436 |
| 9,568,091 B2 | 2/2017 | Drill et al. | |
| 9,752,671 B2 | 9/2017 | Kampe et al. | |

(Continued)

FOREIGN PATENT DOCUMENTS

WO    2010101729 A1    9/2010

*Primary Examiner* — Daniel D Yabut
(74) *Attorney, Agent, or Firm* — Dickinson Wright PLLC

(57) ABSTRACT

A transfer case includes a mainshaft with a drive gear rotationally fixed thereto, a combined oil device, and a lubricating pump driven by the drive gear, with the lubricating pump offset from the axis of the mainshaft. The transfer case includes a rear housing, where lubricating oil is drawn from a sump at the bottom of the transfer case. The pump pressurizes the oil and delivers the oil via passageways from the radially offset pump to an annular chamber of the combined oil device. The passageways may be provided in a manifold block that is fixed to the housing. The annular chamber surrounds the mainshaft and provides fluid into a central passage thereof. The combined oil device is axially between the drive gear and a rear extension of the rear housing, and includes a sealing ring that delimits the annular chamber and separates it from the rear extension.

20 Claims, 23 Drawing Sheets

(56) References Cited

U.S. PATENT DOCUMENTS

| | | |
|---|---|---|
| 9,803,740 B2 | 10/2017 | Drill |
| 10,247,295 B1 | 4/2019 | Bennett, Sr. |
| 10,309,522 B2 | 6/2019 | Palazzolo et al. |
| 10,330,183 B2 | 6/2019 | McNally et al. |
| 10,583,734 B2 | 3/2020 | Morton et al. |
| 11,525,506 B2 | 12/2022 | Hart et al. |
| 2016/0160713 A1 | 6/2016 | Reedy |
| 2016/0363201 A1* | 12/2016 | McNally ............ B60K 23/0808 |
| 2022/0252146 A1* | 8/2022 | Hart ........................ F16H 57/02 |

* cited by examiner

OFFSET TRANSFER CASE PUMP WITH LUBRICATION DISTRIBUTION SYSTEM

CROSS-REFERENCE TO RELATED APPLICATIONS

This application is a Continuation-in-Part of U.S. patent application Ser. No. 17/897,708, filed Aug. 29, 2022, which claims the benefit of U.S. Provisional Patent Application No. 63/238,265, filed Aug. 30, 2021, the entire content of which is hereby incorporated by reference in its entirety.

FIELD OF THE INVENTION

The present disclosure is generally related to a reduced power loss lubrication system providing pressurized oil to various components within a transfer case. More specifically the invention relates to a lubrication pump which is driven offset from the mainshaft and includes lubrication passages through a housing or a manifold block disposed in a housing which feed oil to the mainshaft via an oil transfer device.

BACKGROUND OF THE INVENTION

This section provides background information related to the present disclosure which is not necessarily prior art.

Transfer case lubrication pumps are required to pull lubricating oil from a sump formed between the front and rear housings and distribute to various components within the transfer case requiring lubrication and heat removal during operation. Typically, these lubrication pumps are gerotor pumps positioned to surround the mainshaft of the transfer case and transmit oil into passages in the central portion of the mainshaft for distribution to other components. A gerotor pump has an eccentric outer rotor and an inner rotor that is fixed for rotation with a drive member such as a mainshaft. The inner rotor has external lobes which are meshed with and eccentrically offset from internal lobes formed on the outer rotor. The rotors are rotatably disposed in a pressure chamber formed in a pump housing. Rotation of the mainshaft results in the rotors generating a pumping action such that fluid is drawn from a sump in the transfer case into a low pressure inlet side of the pressure chamber and is subsequently discharged from a high pressure outlet side of the pressure chamber at an increased fluid pressure. The higher pressure fluid is delivered from the pump outlet through one or more fluid flow passages to specific locations along the driven shaft to lubricate rotary components and/or cool frictional components. As the mainshaft has a minimum required diameter to allow torque transfer from the transmission and onto the driveshaft transmitting power to the rear axle, the diameter of the pump cannot be reduced while still positioned on the mainshaft. This leads to a pump that causes higher power losses than if it were optimized based on required lubrication requirements with no restriction on inner diameter. Examples of a transfer case pumps positioned on the mainshaft can be seen in further detail in U.S. Pat. No. 7,757,816B2 issued Jul. 20, 2010 and U.S. Pat. No. 9,803,740B2 issued Oct. 31, 2017.

Testing and analysis has indicated that the pump is one of the main contributing factors causing drag in a transfer case assembly, which results in reduced fuel economy for the vehicle. Therefore, improvements are required to reduce the drag losses caused by the pump while still providing acceptable lubrication to the components within the transfer case during all operating conditions. Positioning the pump in an offset, or non-coaxial, arrangement to the mainshaft would allow for the design of an optimized gerotor pump specific to the lubrication requirements as it can be designed without the restriction of the mainshaft diameter. A negative aspect of utilizing an offset pump is the difficulty to transfer the pressurized oil into the mainshaft to still effectively utilize the existing lubrication passages in the mainshaft to distribute oil to the required transfer case components.

In view of the above, there is a need to provide an efficient offset transfer case lubrication pump with a lightweight, economical oil distribution system to connect between the offset pump outlet and the existing mainshaft lubrication inlet.

SUMMARY

It is an aspect of the present disclosure to provide a transfer case lubrication system with an optimized offset positive displacement pump driven by the mainshaft and a distribution system to distribute lubricating oil to a passage located in the center of the mainshaft.

It is an aspect to separate the integration of the oil pump, drive components, and oil transfer device to allow flexibility and reuse of individual components across various applications.

It is a related aspect of the present disclosure to provide a lightweight and economical oil distribution device communicating oil from the pump and surrounding the mainshaft to feed to a passage located in the center of the mainshaft.

It is a related aspect to separate the pump components from the oil distribution device to optimize the materials utilized.

It is a related aspect to provide an oil transfer housing that interfaces between a feed passage formed in the rear housing or a manifold block, and that surrounds the mainshaft to supply oil to the passage located in the center of the mainshaft.

It is a related aspect to provide a system which continues to feed a similar volume of lubricating oil to the passage located in the center of the mainshaft to ensure lubrication supply is unchanged from a shaft mounted pump but with less power loss.

It is a related aspect to provide a lubrication passage to meter a specific amount of oil to the rear support bearing, seal, and rear yoke bushing.

It is another aspect of the present disclosure to provide a manifold block in the transfer case housing that meters a specific amount of oil to the rear support bearing, seal, and rear yoke bushing.

It is a related aspect of the present disclosure to control the level of lubrication in the rear extension portion of the transfer case housing to improve a seal function In accordance with these and other aspects, an offset driven transfer case lubrication pump and oil distribution device is provided for use in motor vehicles to provide reduced power losses while achieving the same lubrication requirements. The transfer case mainshaft is modified to receive a drive gear, which engages a driven gear of the pump positioned offset from the center of the mainshaft. Torque is ultimately transferred from the mainshaft to the driven gear which is attached to a pump shaft. This pump shaft is connected to the inner gerotor, while the outer gerotor is meshed with the inner gerotor and allowed to freely rotate within the bore of the pump housing. The pump assembly is mounted to the transfer case housing where the pump fluidly connects to suction and delivery ports which are integral to the transfer case rear housing. The suction port fluidly connects to a tube and filter positioned in the sump low enough to ensure fluid supply is always available. The discharge port fluidly connects to the inlet of the oil transfer housing, as well as provides for controlled lubrication of the rear bearing, bushing, and seal.

In another aspect, the pump assembly is mounted to the transfer case housing where the pump fluidly connects to suction and delivery ports which are part of a manifold block disposed within the rear housing. The suction port fluidly connects to a tube and filter positioned in the sump low enough to ensure fluid supply is always available. The discharge port, via the manifold block, fluidly leads to the inlet of the oil transfer housing, and the manifold block also provides a separate path for controlled lubrication of the rear bearing, bushing, and seal.

Flexibility in the design is maintained as the pump position can be adjusted in coordination with the drive and driven gears to achieve different pump positions to optimize gear ratios, resulting in adjustment of pump flow dependent on needs of the application.

The oil transfer device is utilized to transfer fluid from the rear housing to the mainshaft central oil passage. The oil transfer device is located adjacent the drive gear and surrounding a radial inlet passage in the mainshaft. The oil transfer device is fitted in tight connection via two journal surfaces to the mainshaft or to a flange portion of the drive gear. This minimizes leakage out of the oil transfer device and improves oil flow into the mainshaft. The oil transfer device includes an annular portion to feed oil to the mainshaft oil passage, a radially extending mounting arm, and a radially extending tube which is fluidly connected to the fluid passageways formed in the housing or to manifold block, which lead to the discharge port of the pump. An oil dam delimits a rear extension of the rear housing, providing an oil dam to create an elevated sump to supply fluid to the rear bearing, yoke bushing, and seal. In one aspect, the oil dam provides an anti-rotation feature for the oil transfer device assembly as well as a mounting bore for receiving a mounting stud for the front portion of the oil transfer device. In another aspect, an anti-rotation feature at the opposite end of the oil transfer device is provided by the manifold block, which is fixed to the rear housing. The oil dam and oil transfer device can be part of a combined oil device, in which a sealing ring delimits the annular chamber that receives the oil from the pump, and which also delimits the rear extension, with the combined oil device being axially between the drive gear and the rear extension. The combined oil device and annular chamber may surround a flange portion of the drive gear, which includes openings that are aligned with the radial inlets that extend to the central passage of the main shaft for providing fluid from the annular chamber.

These and other features and advantages of the present invention will become more readily appreciated when considered in connection with the following detailed description and appending drawings.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DESCRIPTION OF THE ENABLING EMBODIMENTS

The example embodiments will now be described more fully with reference to the accompanying drawings. In general, these figures and graphs are related to an offset driven transfer case pump with, in one aspect, oil passages integrated into the rear housing or, in another aspect, a manifold block disposed in the rear housing, both of which are provided for supplying oil to and through an oil transfer device into a mainshaft central lubrication passage. It is to be recognized the example embodiments only are provided so that this disclosure will be thorough, and will fully convey the scope, which is ultimately defined by the claims, to those who are skilled in the art. Numerous specific details are set forth, such as examples of specific components, devices, and methods, to provide a thorough understanding of embodiments of the present disclosure. It will be apparent to those skilled in the art that certain specific details need not be employed, that example embodiments may be embodied in many different forms, and that neither should be construed to limit the scope of the disclosure or the claims. In some example embodiments, well-understood processes, well-understood device structures, and well-understood technologies are not described in detail.

Figure 1:
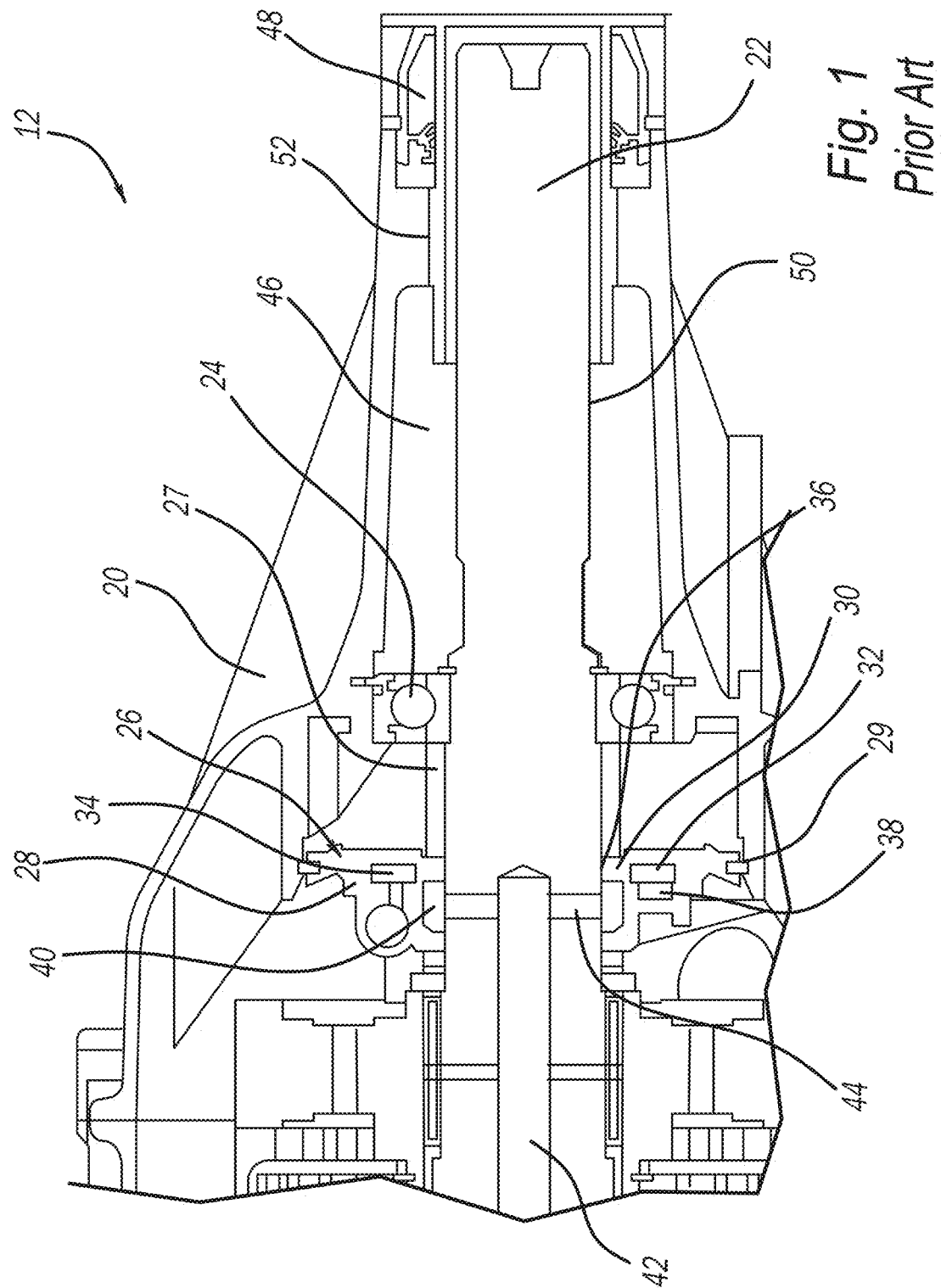
FIG. 1 is a cross-sectional view of the rear portion of a transfer case showing a traditional coaxially mounted pump driven by the mainshaft.

Referring to FIG. 1, a conventional transfer case lubrication system is shown in a partial view of transfer case 12. In this view, only the rear portion of the transfer case is shown to explain the interfaces, functionality, and lubrication flow paths. Transfer case rear housing 20 is shown enclosing transfer case 12 components including mainshaft 22 which is supported by rear bearing 24. In this design, oil pump assembly 26 is mounted and surrounding coaxially mainshaft 22 and is positioned forward in the vehicle direction in spacer 27. The oil pump is also positioned within a bore 29 of rear housing 20 and provided with a radially extending arm to prevent rotation of the oil pump 26 but is not shown in this view. Oil pump 26 includes a pump housing 28 surrounding an inner gerotor ring 30 and an outer gerotor ring 32 and enclosed by cover 34. These pump components are often made from powder metal and stampings. Between pump housing 28 and cover 34, pump chamber 38 is formed. A spline interface 36 transmits torque from mainshaft 22 to the inner gerotor ring 30. The pumping action caused by rotation between inner gerotor ring 30 and outer gerotor ring 32 within pump chamber 38 causes the fluid, typically automatic transmission fluid, to be suctioned from a lubrication sump (not shown) that is formed between the front and rear housing 20 of the transfer case. A tube fluidly connects the suction side of oil pump 26 to this lubrication sump. Pressurized fluid is ultimately discharged into an annular outlet chamber 40 formed in pump housing 28 at the higher outlet pressure. Fluid discharged from outlet chamber 40 is delivered to a central lubrication passage 42 formed in mainshaft 22 via a plurality of radial supply bores 44. Central passage 42 communicates with various rotary elements located downstream of fluid pump 26 such as, for example, bearings, journal sleeves, speed gears and friction clutch packs via a series of radial lubrication and cooling delivery bores (not shown) formed in mainshaft 22. Lubrication is also required in the rear extension cavity 46 of rear housing 20 which creates an elevated area relative to the main transfer case sump to provide a constant source of lubrication to the rear bearing 24, rear seal 48, mainshaft splines 50, and the bushing 52 which supports the driveshaft yoke (not shown). In this arrangement, lubricating oil is fed by a combination of splash lubrication from the chain and leakage from the rear portion of pump 26, but is dependent on various part tolerances and transfer case operation. These tolerance and operating differences can result in inefficient pump operation. The present disclosure provides improvements relative to the arrangement of FIG. 1 to ensure lubricating oil is continually fed into this area and an optimized oil level in the rear extension cavity is maintained.

Figure 2:
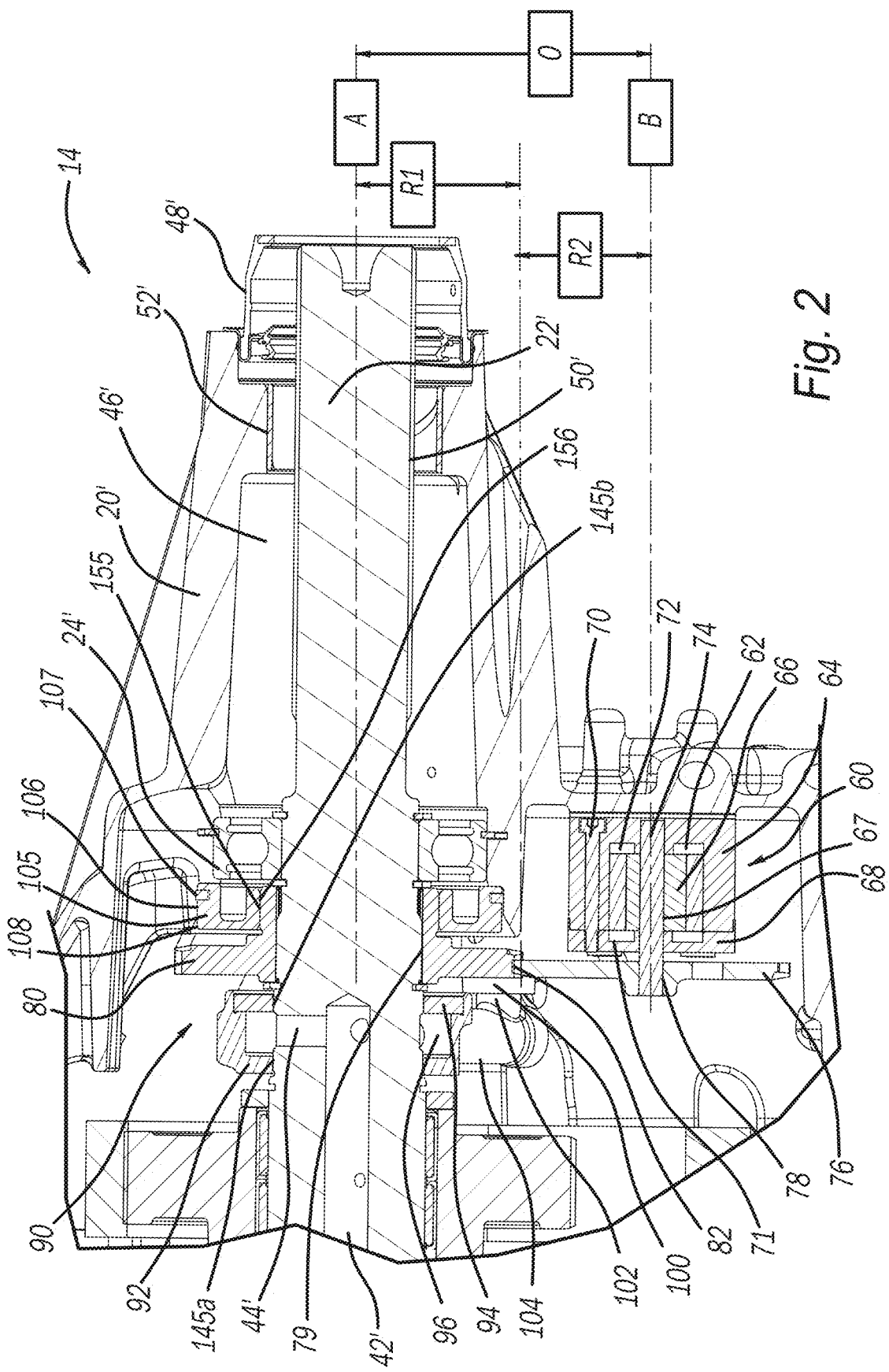
FIG. 2 is a cross-sectional view of the rear portion of a transfer case of the present invention.

Referring to FIG. 2, an embodiment of the present disclosure is shown. Components and features labeled with prime (') are significantly similar to those shown and described in FIG. 1. Again, in this view only the rear portion of the transfer case 14 is shown to explain the interfaces, functionality, and lubrication flow paths. Transfer case rear housing 20' is shown enclosing transfer case components including mainshaft 22' which is supported by rear bearing 24'. In this design, offset oil pump assembly 60 is mounted within rear housing 20' in a position which is distance O from the center axis A of mainshaft 22'. In one aspect, oil pump assembly 60 is mounted directly to the rear housing 20'. In another aspect, oil pump assembly 60 is mounted to manifold block 200, which is mounted to rear housing 220'. In both embodiments, oil passageways are provided that provide oil from the sump up to the mainshaft 22'.

It will be appreciated to a person of skill in the art that unless otherwise noted or contradictory, the features of one embodiment may be applicable to the other embodiment, and vice versa. It will be appreciated that references made to rear housing 20' may be applicable to rear housing 220'. The difference between rear housing 20' and rear housing 220' lies in the difference between having oil communication passageways integrally formed in the rear housing 20' vs. the oil communication passages provided by the manifold block 200. When provided by the manifold block, the rear housing 200 will instead have a different housing shape to create a cavity or space in which the manifold block is disposed. However, the functionality aside from the provision of fluid passageways from the offset pump 60 to the mainshaft 22' is generally the same. For example, the same type of offset location for the pump 60 is provided, the same sump operation in combination with the front housing is provided, the same rear chamber for accommodating the mainshaft 22' is provided, etc.

The oil communication features will be further described in later figures. In one aspect, the oil communication features are formed in the rear housing 20' to fluidly connect the pump 60 to the sump and oil device via suction and discharge passages. In another aspect, the oil communication features are included in manifold block 200, which is disposed in and mounted to the rear housing 20' to fluidly connect the pump 60 to the sump and oil device via suction and discharge passages.

Offset oil pump assembly 60 can be a positive displacement pump, such as a gerotor pump as shown here. The offset oil pump assembly has a pump housing 62 which surrounds an outer gerotor ring 64 and inner gerotor ring 66, similar to those described in FIG. 1 but in reduced diameter due to the elimination of the requirement that it must surround mainshaft 22. A cover 68, connected tightly and in a sealed manner to pump housing 62 via a plurality of fasteners 70, creates pump chamber 71. Outer gerotor ring 64 is allowed to freely rotate within the bore of pump housing 62 and is meshed to inner gerotor ring 66. Inner gerotor ring 66 is attached via press fit 67 to pump shaft 74. Pump shaft 74 receives power from driven gear 76 via a fixed connection 78 (i.e. spline or pressfit), which is rotated by drive gear 80 which has a similar power transmitting connection 79 (such as a press fit) to mainshaft 22'. Drive gear 80 is positioned in the same area of spacer 27 of the conventional design of FIG. 1 (to the right of oil supply bore 44' in FIG. 2). Mainshaft 22' is slightly modified from prior mainshaft 22 to extend spline region 79 fully under drive gear 80 based on torque transfer requirements.

Therefore, power is transmitted thru the drive 80 and driven 76 gears via spur gear mesh 82 to result in a rotation of inner gerotor ring 66 and outer gerotor ring 64 and subsequent pumping action within pump chamber 71, between cover 68 and oil pump housing 62, and pressure chamber 72, between oil pump housing 62 and rear housing 20' (or between oil pump housing and manifold block 200 when the oil pump 60 mounts to manifold block rather than directly to the housing 20'). Pressure chamber 72 is further divided in into low pressure and high pressure portions (chambers 72a-d described further below). Chambers 72a-72d may be formed by a combination of pump housing 62 and the rear housing 20', or a combination of pump housing 62 and manifold block 200.

The pumping action causes the fluid to be suctioned from a lubrication sump (rear portion shown in FIG. 9) that is formed between the front and rear housing 20' of the transfer case. A tube 130 (shown in FIG. 9) fluidly connects the suction side of offset oil pump 60 to this lubrication sump. Pressurized fluid is ultimately discharged through the fluid passageways, either integrally formed in the rear housing 20' or provided in the manifold block 200, where the fluid passageways brings the oil to oil transfer device 90 at the higher outlet pressure. The oil transfer device 90 may also be referred to as an oil distribution device.

Referring still to FIG. 2, oil transfer device 90 is positioned generally in a similar space where prior oil pump 26 resides in the prior conventional design of FIG. 1, with oil transfer device 90 of the present disclosure surrounding coaxially the mainshaft 22' forward of rear bearing 24' (to the left of drive gear 80 in FIG. 2). Oil transfer device 90 has a housing portion 92 and a cover portion 94. The oil transfer device surrounds mainshaft 22' tightly but with a clearance which allows rotation of the mainshaft 22' as the oil transfer device 90 is rotationally fixed in relative position to rear housing 20'. The housing portion 92 and cover portion 94 form an annular chamber 96 which surrounds mainshaft 22'.

Figure 3:
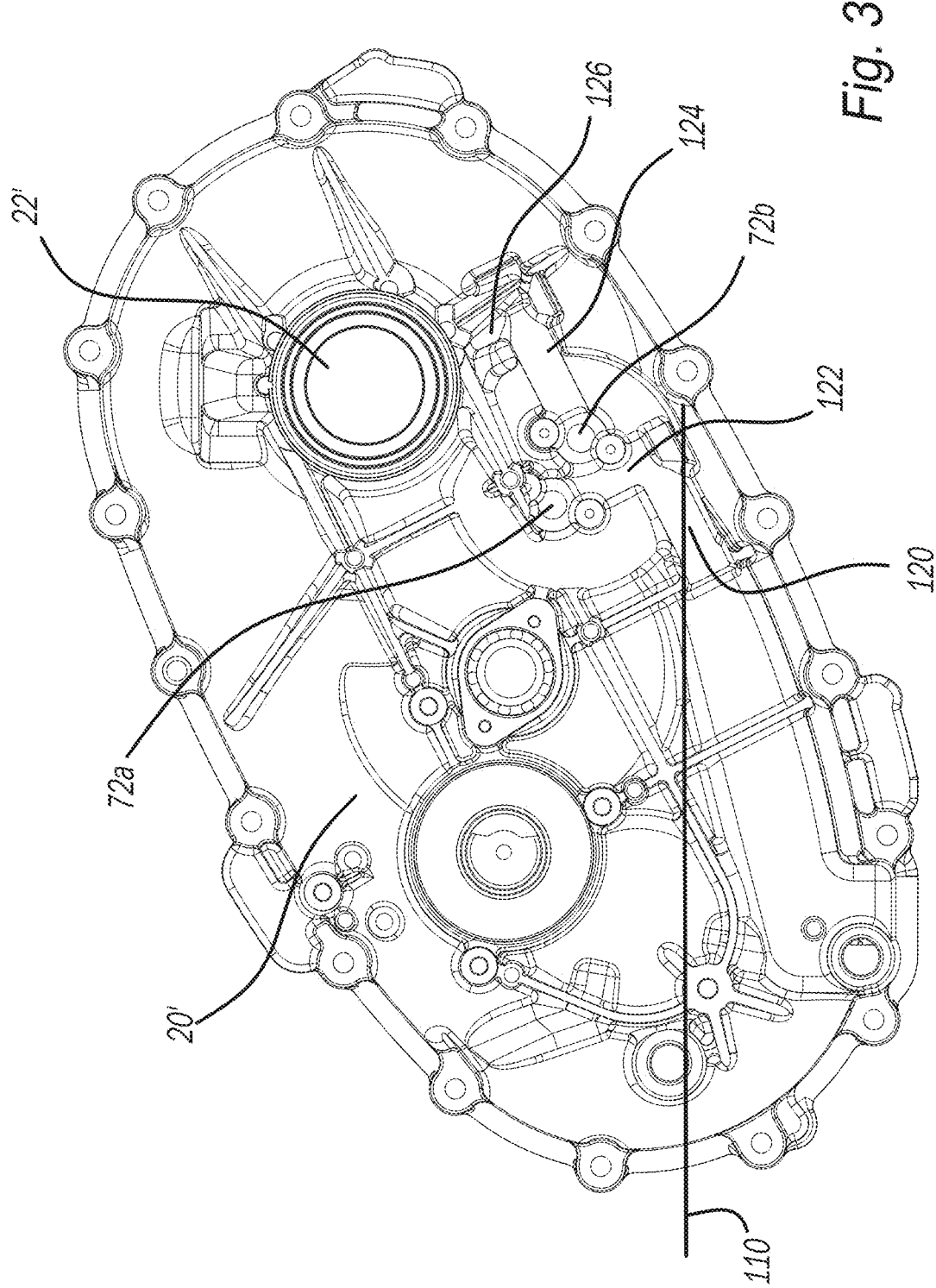
FIG. 3 is an external view of the rear housing illustrating lubrication passages formed integral with the rear housing.
Figure 4:
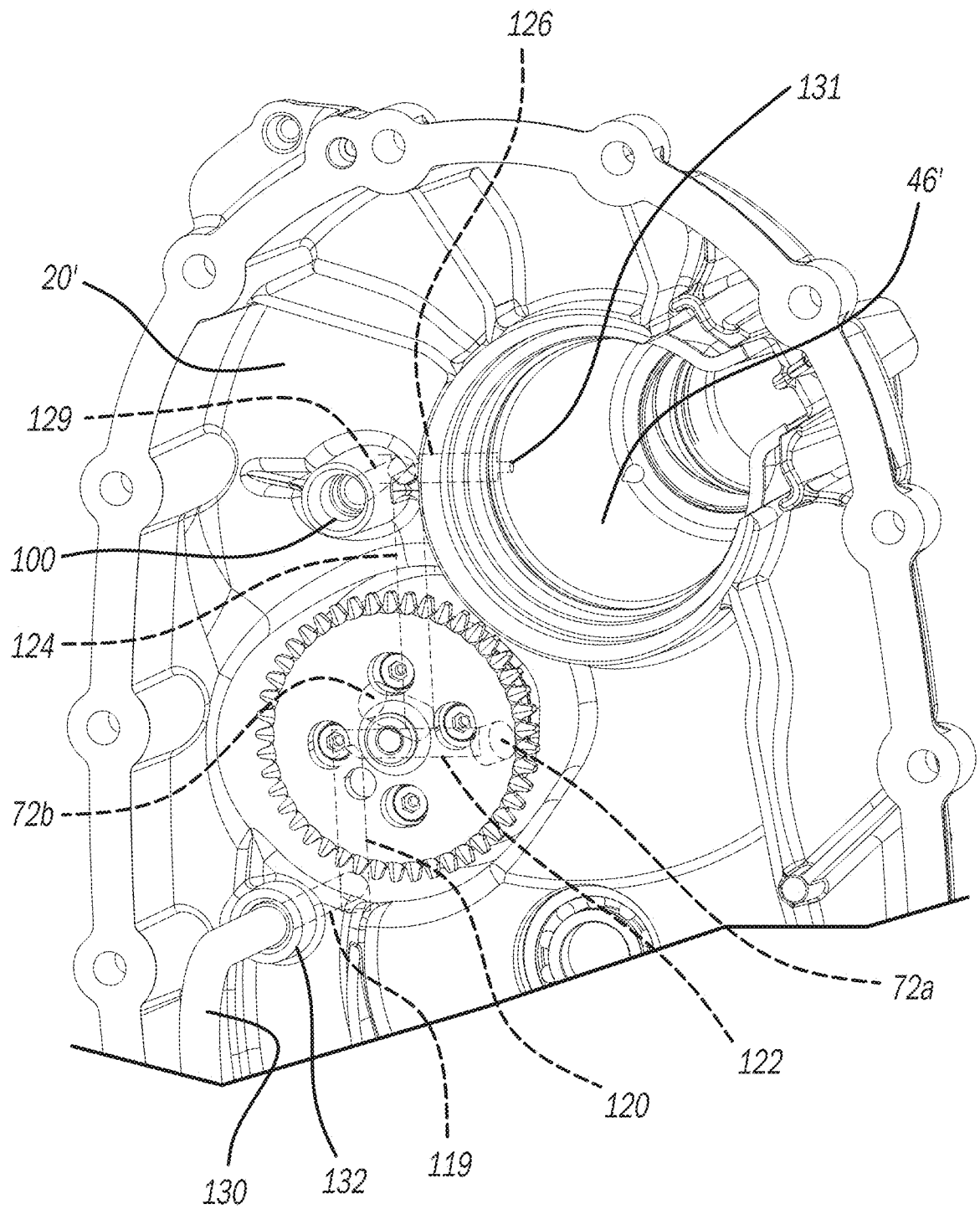
FIG. 4 is an internal view, looking rearward, of the rear housing showing the lubrication passages integrally formed with the housing and a mounting location for a pump.

Lubrication fluid is transferred from offset oil pump 60 via a connection to port 100 formed in rear housing 20' via passages integrated in rear housing 20', which will be further described in FIG. 3 and FIG. 4. Port 100 is fluidly connected to the high pressure discharge portion of pump chamber 72b/72d, thereby delivering pressurized lubricating fluid into passage 102 of oil transfer device 90 which fluidly connects to a radial extending passage 104 of oil transfer device 90. Passage 104 extends from the central portion of housing 92 of oil transfer device 90. Pressurized fluid feeds from radial passage 104 into an annular chamber 96 and is delivered to a central lubrication passage 42' formed in mainshaft 22' via a plurality of radial supply bores 44'. Central passage 42', similar to the passage 42 of the conventional design of FIG. 1, communicates with various rotary elements located downstream of oil transfer device 90 such as, for example, bearings, journal sleeves, speed gears and friction clutch packs via a series of radial lubrication and cooling delivery bores (not shown) also formed in mainshaft 22'.

In the second embodiment, lubrication fluid is transferred from offset oil pump 60 via a connection to manifold block 200 disposed in rear housing 20' via passages in manifold block 200. Outlet port 201 of manifold block is fluidly connected to the high pressure discharge portion of pump chamber 72b/72d, thereby delivering pressurized lubricating fluid into passage 102 of oil transfer device 90 which fluidly connects to a radial extending passage 104 of oil transfer device 90. Passage 104 extends from the central portion of housing 92 of oil transfer device 90. Pressurized fluid feeds from radial passage 104 into an annular chamber 96 and is delivered to a central lubrication passage 42' formed in mainshaft 22' via a plurality of radial supply bores 44'. Central passage 42', similar to the passage 42 of the conventional design of FIG. 1, communicates with various rotary elements located downstream of oil transfer device 90 such as, for example, bearings, journal sleeves, speed gears and friction clutch packs via a series of radial lubrication and cooling delivery bores (not shown) also formed in mainshaft 22'.

Surrounding an external surface of drive gear 80 is oil dam 105. Oil dam 105 provides two functions: a component to seal with rear housing 20' to maintain an elevated sump in rear extension cavity 46'; and, a mounting location for oil transfer device 90. Oil dam 105 controls oil in an elevated oil volume in rear extension cavity 46' of rear housing 20'. Like the conventional design in FIG. 1, rear extension cavity 46' is used to provide an elevated sump containing fluid to lubricate to the rear bearing 24', rear seal 48', mainshaft splines 50', and the bushing 52' which supports the driveshaft yoke (not shown). Oil dam 105 includes a sealing ring 107 to tightly seal between bore 108 of rear housing 20' (shown also in FIG. 8) and the outer diameter 106 of oil dam 105, as there is no relative rotation between outer diameter 106 and housing bore 108. In order to maintain an elevated sump in extension cavity 46', a generally tight diametrical fit allowing relative motion is also is required between inner diameter 155 of oil dam 105 and the outer diameter shoulder surface 156 of drive gear 80. As drive gear 80 is connected to rotating mainshaft 22', but oil dam 105 is fixed to housing 20', relative motion is provided between surface 155 and 156. A proper lip seal could be used in this position, but this must be balanced between the benefits of providing a positive sealing arrangement versus the additional drag due to this sealing arrangement, therefore for this application a journal fit between surfaces 155 and 156 is utilized.

As will be described later, oil dam 105 is located in a fixed position relative to oil transfer device 90, thereby limiting or preventing relative rotation therebetween, such that anti-rotation features provided by one is applied to the other, and includes features to locate oil transfer device 90 and prevent rotation of oil dam 105 and oil transfer device 90. As described further below, oil dam 105 also includes features that engage with corresponding structure of the rear housing 20 to prevent rotation of oil dam 105, and correspondingly prevent rotation of the oil transfer device 90 coupled thereto. These feature of rear housing 20' are not provided in rear housing 200, as further described below.

In the embodiment having the manifold block 200, oil dam 105 is located in a fixed position relative to oil transfer device 90, thereby limiting or preventing relative rotation therebetween, such that anti-rotation features provided by one is applied to the other. In this embodiment, anti-rotation and locating features provided by manifold block 200 to oil transfer device 90 are operable to block rotation of oil dam 105 via the connection between oil transfer device 90 and oil dam 105.

Continuing to reference FIG. 2, locating the pump 60 at an offset position relative to the center axis A of mainshaft 22' provides greater flexibility in design and optimization specific to the needs of the application. As discussed before, eliminating the requirement of prior oil pump 26 to be positioned surrounding prior mainshaft 22 can result in a compact and efficient pump assembly of the present disclosure as described for pump 60. First the location of offset pump 60 can be flexible and positioned generally anywhere radially offset and parallel to mainshaft 22', in generally any angular position around mainshaft 22' as well as generally any offset distance O to mainshaft 22', which can eliminate potential interferences with internal transfer case components or external packaging constraints. Unlike other prior systems where the pump and oil distribution housing is combined into one assembly, by separating the offset pump 60 from the components forming the oil transfer device 90, the present disclosure results in much more flexibility to reutilize components across various applications. Separating oil distribution components, with lower tolerance requirements and minimal force requirements, from pump components, requiring a higher level of precision and strength, allows oil distribution components to be made from plastic, for example, which is lighter and more economical. Additionally, offset pump 60 can be the same design and a shared component with other applications of transfer cases or transmissions, allowing for better economics due to increased volumes.

As rear housing 20' is often different from application to application, the integrated lubrication passages formed in the rear housing 20', or the manifold block 200 disposed within the rear housing 220', can be adjusted based on the desired position of oil pump 60 and port 100 feeding lubricant to oil transfer device 90, in particular by connecting to passages 102 and 104 of oil transfer device 90.

Further adding flexibility, the pump flow characteristic can also be adjusted by changes in the radius R1 of drive gear 80 and radius R2 of driven gear 76, resulting in increasing or decreasing the pump input speed relative to the rotational speed of mainshaft 22', even within the same offset O between mainshaft 22' and pump 60. The offset pump 60 flow rate can be adjusted based on the ratio (R1/R2) for actual application needs (i.e. when most lubrication or heat transfer via oil) is required based on vehicle speed operating point.

Referring to FIG. 3, an outer view of rear housing 20' is shown with particular attention to the oil passages for feeding to and discharging from offset oil pump 60 mounted within (on the opposite side as shown) rear housing 20'. Static oil level is shown by line 110. When offset oil pump 60 is rotated, lubricating oil will be picked up from below oil level 110 through a suction tube 130 (see FIGS. 4 and 9) and into housing inlet port 132 (shown in FIG. 4). Housing inlet port 132 feeds via suction into housing oil passage 119 (see FIG. 4), then into oil passage 120 bringing fluid towards an intersection with oil passage 122 and into a low pressure pump chamber 72a which is integrally formed into the housing 20', which cooperates with low pressure pump chamber 72c formed within oil pump. As offset pump 60 rotates during vehicle forward motion, where pumping action caused by the rotation of inner gerotor ring 64 and outer gerotor ring 66 will pressurize fluid, fluid is pumped into chamber 72d (formed within the oil pump housing 62, shown in FIG. 6) and into high pressure chamber 72b formed into the rear housing 20'. Pressurized fluid will travel through delivery passage 124, intersecting into delivery passages, which will be further described.

Referring to FIG. 4, a view inside rear housing 20' shows in detail the delivery channels integrated in the rear housing 20' and suction tube 130. As described earlier, oil is supplied from the sump via suction tube 130, into housing inlet port 132, and continues thru passages 119, 120 and 122. At this point oil is brought into low pressure chambers 72a and 72c, pressurized by offset pump 60, and supplied to high pressure chambers 72b and 72d. Pressurized lubricating oil then travels thru passage 124 and oil volume is distributed between two different paths: oil flowing through passage 129 and into oil transfer device 90 (via passage 102 connected to port 100), and also into rear extension cavity 46' via rear extension passage 126. A metered passage 131 (shown also in FIG. 8) controls the amount of lubricant entering rear extension cavity 46'. The metered passage 131 is a smaller diameter bore when compared to the bore diameter of passage 126 to restrict the amount of flow based on application requirements. This ensures some oil is constantly fed to the rear extension cavity 46', but a majority of oil is fed into the oil transfer device 90.

The provision of oil to the oil transfer device in the second embodiment is similar with regard to pressurizing the fluid and feeding the oil to the mainshaft 22' and rear extension cavity 46', but with the oil passageways provided by the manifold. This arrangement will now be described.

Figure 12:
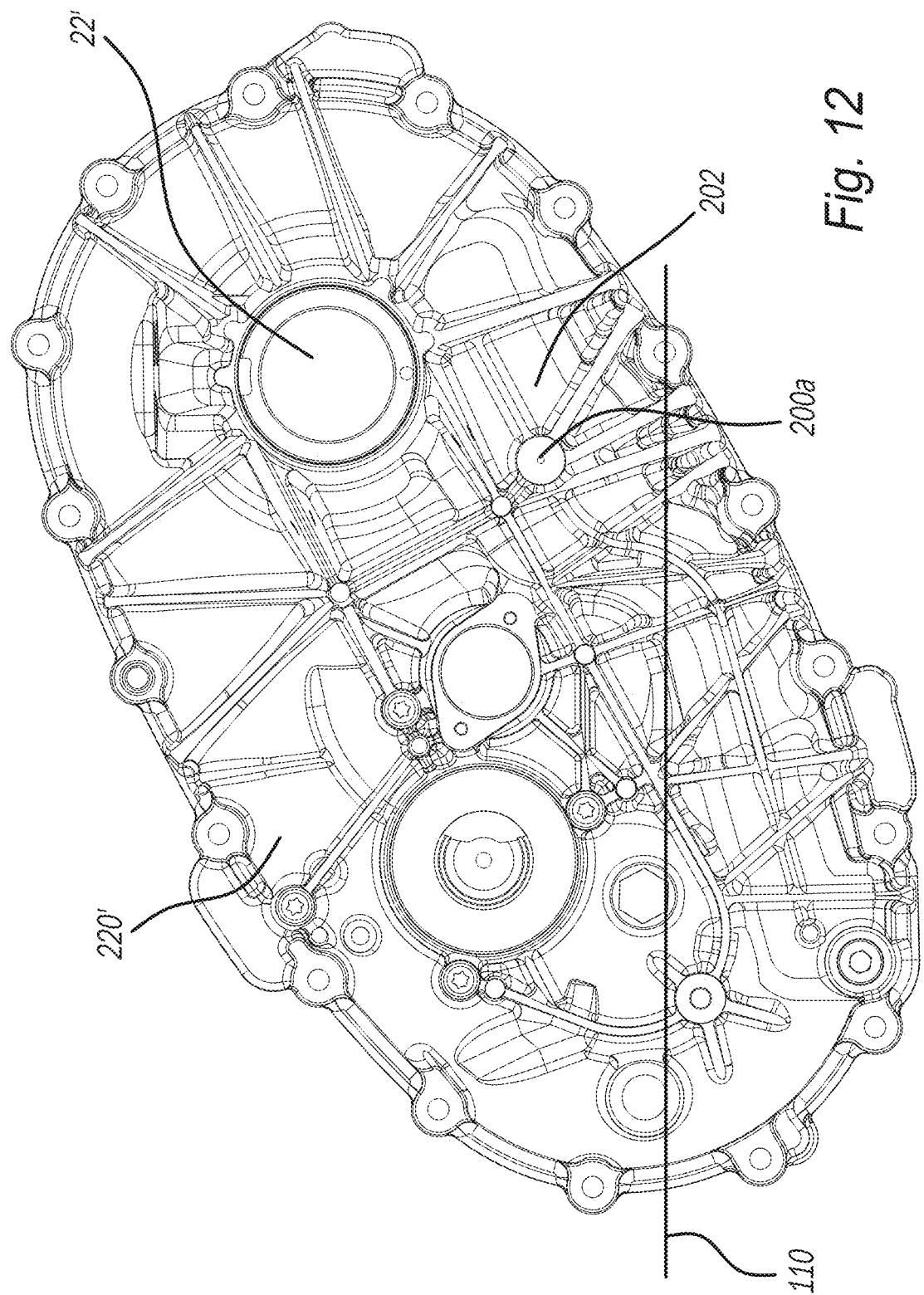
FIG. 12 is an external view similar FIG. 3, looking forward, of a second embodiment of the rear housing illustrating a protruding wall section for accommodating therein a manifold block having the lubrication passages.

Referring now to FIG. 12, an outer view of rear housing 220' is shown with particular attention to the housing portion 202 for accommodating suction tube 130 and manifold block 200 inside of rear housing 220', which provides feeding to and discharging from offset oil pump 60 mounted within (on the opposite side as shown) of rear housing 220'. Static oil level is shown by line 110. When offset oil pump 60 is rotated, lubricating oil will be picked up from below oil level 110 through suction tube 130 (see FIGS. 4 and 9) and into manifold inlet port 232. Manifold inlet port 232 feeds via suction into the manifold block 200 and into a low pressure pump chamber 72a formed in manifold block 200 and low pressure pump chamber 72c formed within oil pump housing 62. As offset pump 60 rotates during vehicle forward motion, where pumping action caused by the rotation of inner gerotor ring 64 and outer gerotor ring 66 will pressurize fluid, fluid is pumped into chamber 72d (formed within the oil pump housing 62, shown in FIG. 6) and into high pressure chamber 72b formed in manifold block 200. Pressurized fluid will travel through delivery passage 224 of manifold block 200 an ultimately to manifold block outlet port 201.

Figure 13:
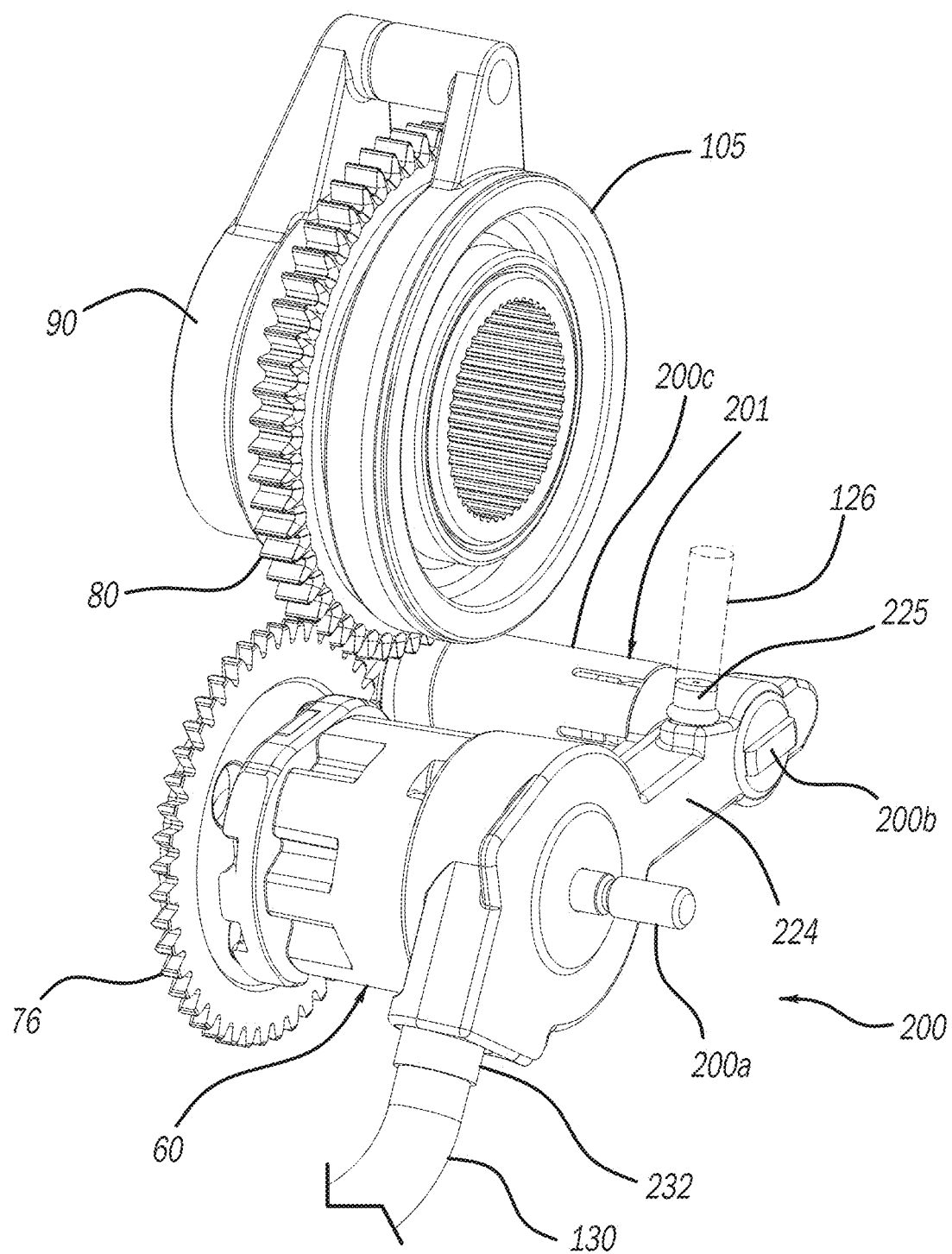
FIG. 13 is an isometric view, looking forward, showing the manifold block and pump in an assembled state with the oil transfer device and the oil dam, with the rear housing and mainshaft removed for clarity.

Referring to FIG. 13, an isometric view, from the rear looking forward with rear housing 220' removed for clarity, shows in further detail the manifold block 200 connected between the pump 60 and the oil transfer device 90. Manifold block 200 may be fixed to housing via bolt 200a, and may further include alignment feature 200b that fits within a corresponding structure of rear housing 200'. As described earlier, oil is supplied from the sump via suction tube 130, into manifold inlet port 232. At this point oil is brought into low pressure chambers 72a and 72c, pressurized by offset pump 60, and supplied to high pressure chambers 72b and 72d. Pressurized lubricating oil then travels thru passage 224 and oil volume is distributed into oil transfer device 90 (via passage 102 connected to manifold outlet 201) and also into rear extension cavity 46' via rear cavity feed plug 225 and rear bore 226. Rear cavity feed plug 225 may provide the metering instead of metered passage 131 described previously, to control the amount of lubricant entering rear extension cavity 46'. The feed plug 22 can therefore restrict the amount of flow based on application requirements. This ensures some oil is constantly fed to the rear extension cavity 46', but a majority of oil is fed into the oil transfer device 90.

Figure 5:
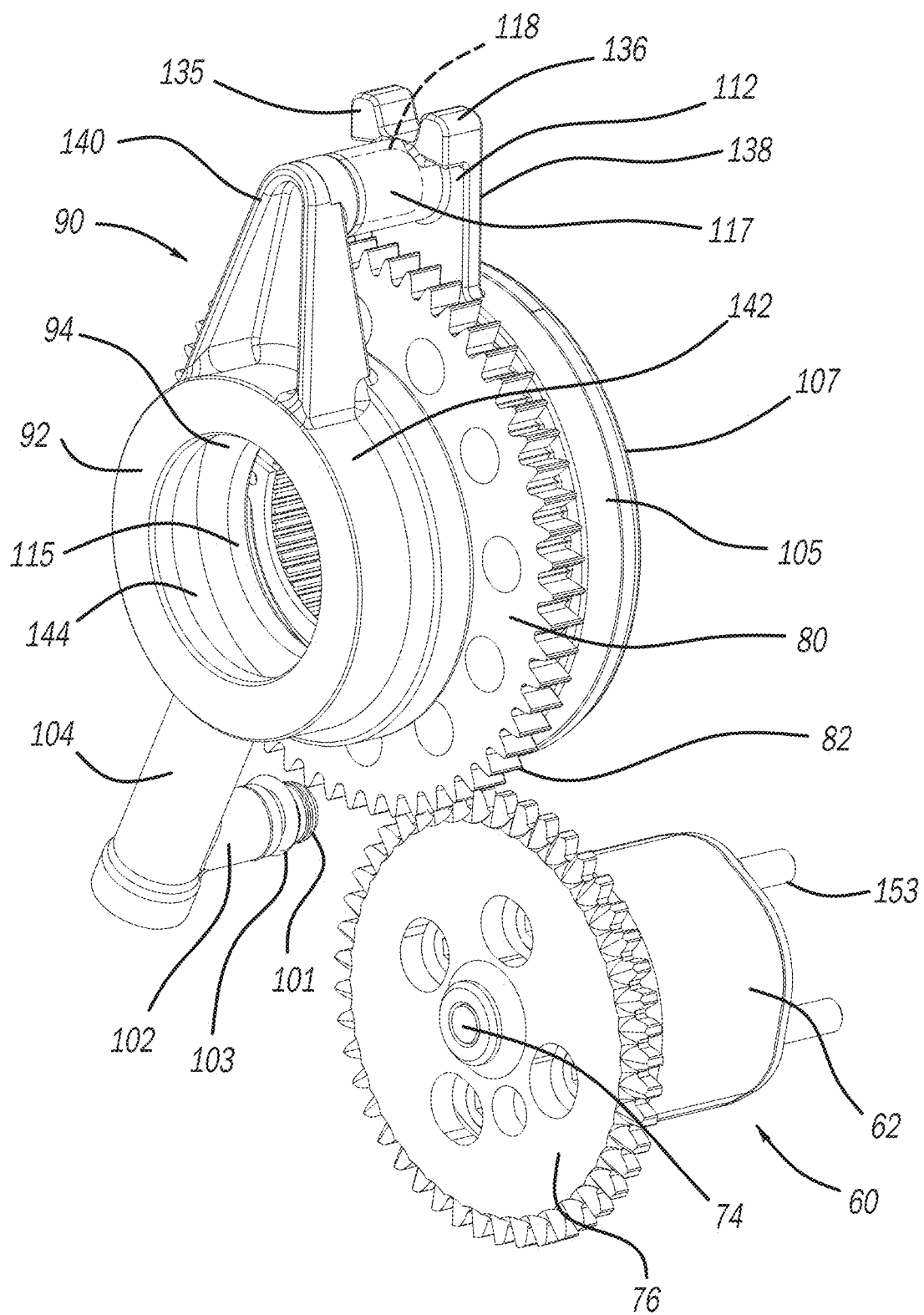
FIG. 5 illustrates in an isometric view, from the front looking rearward, of the offset transfer case pump arrangement, oil transfer device, and oil dam, in an assembled and installed position, with the mainshaft and rear housing removed for clarity.

Referring to FIG. 5, the overall assembly of the offset oil pump 60, drive gear 80, driven gear 76, oil transfer device 90, and oil dam 105 are shown in their assembled arrangement without mainshaft 22' shown, viewed from the front of vehicle direction looking rearward. Oil transfer device 90 is made up of housing portion 92 and cover portion 94. Housing portion 92 includes an arm 140 extending radially outwards and directionally upwards from the outer diameter surface 142. This arm 140 connects to anti rotation arm 112 of oil dam 105. This connection provides a mounting point to position oil transfer device 90 at a correctly installed position axially and also to prevent rotation relative to the mainshaft 22', and also rotationally relative to oil dam 105. Oil dam 105 is located within a feature of rear housing 20' which also prevents rotation of oil dam 105 relative to rear housing 20', thereby preventing rotation of oil transfer device 90. At the end of arm 140, furthest from mainshaft 22' axis A, a post feature 117 extends rearward and is inserted during assembly to engage into bore 118 of anti-rotation-arm 112 of oil dam 105. Opposite of arm 140, passage 104, which is hollow to allow oil transfer into annular chamber 96, intersects the outer diameter surface 142 of housing portion 92. Intersecting passage 104 in the rearward direction is passage 102 which connects to port 100 via inserting inlet tube 101 into port 100. An O-ring seal 103 is positioned on the outer diameter of inlet tube 101 to create a fluid tight seal with port 100. These two assembled connections, post 117 into bore 118 and inlet tube 101 into port 100, provide a secure mounting and locate oil transfer device 90 radially and axially relative to surrounding components. During assembly, ensuring that these components are fully seated confirms oil transfer device 90 is positioned concentrically surrounding mainshaft 22' in the correct axial position. The inner diameter 144 of the forward face of housing 92 has a tight diametrical clearance with outer surface 145a of mainshaft 22'. Cover 94 of oil transfer device 90 has a similar inner diameter 115 which also forms a tight diametrical clearance fit with outer surface 145b of mainshaft 22'. The dimensional relationship between faces ensure lubricating oil is efficiently transferred from annular chamber 96 to radial supply bore 44' in mainshaft 22' without significant losses, but also without contributing to additional drag.

Figure 14:
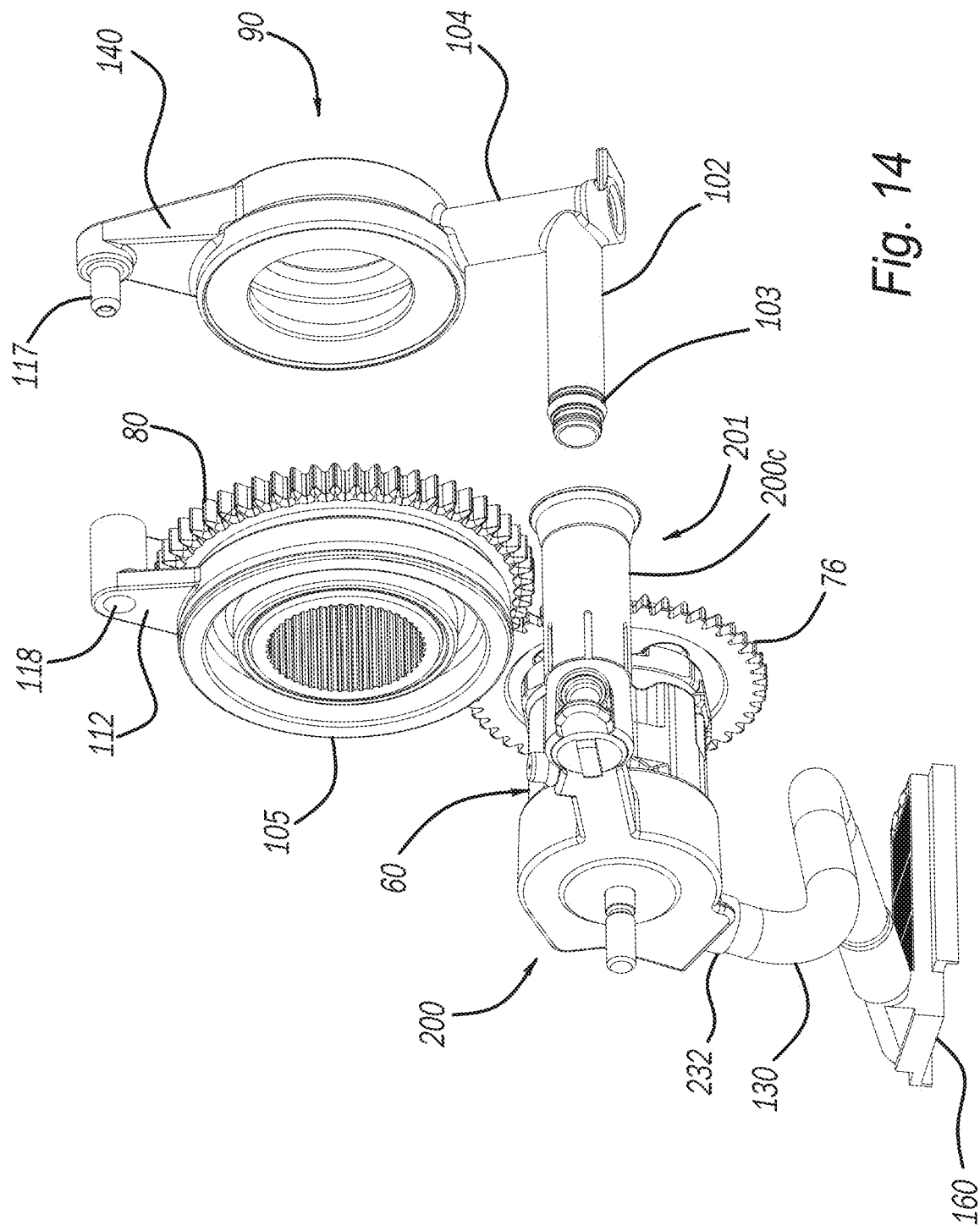
FIG. 14 is an exploded isometric view, from the rear looking forward, of the second embodiment of the offset transfer case pump arrangement, including the oil transfer device, oil dam, and manifold block, with the oil transfer device aligned with the oil dam and a guide tube of the manifold.

With reference to FIG. 14, in the second embodiment having the manifold block 200, the structure of the oil dam 105 is slightly different, as it does not include anti-rotation features interfacing with the rear housing 220'. The oil transfer device 90 is fixed against rotation by radially downward passage 104 and passage 102 extending therefrom, which attaches to manifold block outlet 201. Oil dam 105, being connected to the radially upward arm 140, is thereby also fixed against rotation. The cooperating features of the oil dam 105 and the oil transfer device 90 described above are otherwise similar. Housing portion 92 includes an arm 140 extending radially outwards and directionally upwards from the outer diameter surface 142. This arm 140 connects to a corresponding arm 112 of oil dam 105. This connection provides a mounting point to position oil transfer device 90 at a correctly installed position axially relative to the mainshaft 22' and also rotationally relative to oil dam 105. The oil transfer device 90 is fixed against rotation by radially downward passage 104 and passage 102 extending therefrom, which attaches to manifold block outlet 201. Oil dam 105, being connected to the radially upward arm 140, is thereby also fixed against rotation. At the end of arm 140, furthest from mainshaft 22' axis A, a post feature 117 extends rearward and is inserted during assembly to engage into bore 118 of arm 112 of oil dam 105. Opposite of arm 140, passage 104, which is hollow to allow oil transfer into annular chamber 96, intersects the outer diameter surface 142 of housing portion 92. Intersecting passage 104 in the rearward direction is passage 102 which connects to manifold outlet port 201 via inserting inlet tube 101 into port 201. An O-ring seal 103 is positioned on the outer diameter of inlet tube 101 to create a fluid tight seal with port 201. These two assembled connections, post 117 into bore 118 and inlet tube 101 into port 201, provide a secure mounting and locate oil transfer device 90 radially and axially relative to surrounding components. During assembly, ensuring that these components are fully seated confirms oil transfer device 90 is positioned concentrically surrounding mainshaft 22' in the correct axial position. The inner diameter 144 of the forward face of housing 92 has a tight diametrical clearance with outer surface 145a of mainshaft 22'. Cover 94 of oil transfer device 90 has a similar inner diameter 115 which also forms a tight diametrical clearance fit with outer surface 145b of mainshaft 22'. The dimensional relationship between faces ensure lubricating oil is efficiently transferred from annular chamber 96 to radial supply bore 44' in mainshaft 22' without significant losses, but also without contributing to additional drag.

FIG. 14 also illustrates, in exploded view, how passage 102 is aligned with manifold outlet 201. In this embodiment, an assembly guide tube 200c is include in manifold outlet 201 and surrounds the fluid passage tube that sealingly receives passage 102 and sealing ring 103. During assembly, the manifold block 200 may first be mounted to and installed on rear housing 220' along with pump 60. This assembly is lowered "blindly" onto an assembly of mainshaft 22' and oil transfer device 90. Accordingly, assembly guide 200c may include a flared end that receives and guide the passage 102 into the manifold outlet 201.

Figure 6:
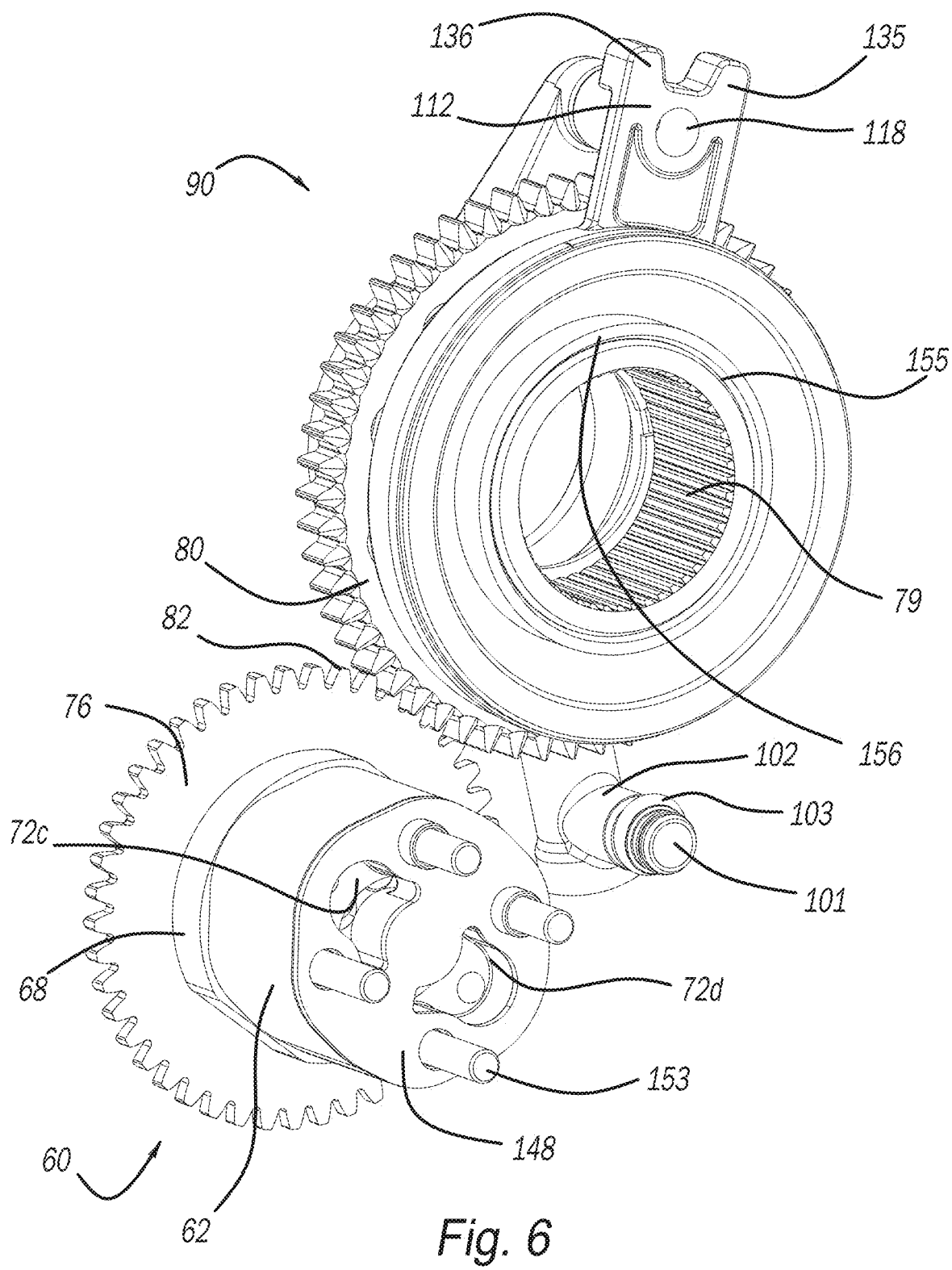
FIG. 6 illustrates in an isometric view, from the rear looking forward, of the offset transfer case pump arrangement, oil transfer device, and oil dam, in an assembled and installed position, with the mainshaft and rear housing removed for clarity.

Referring now to FIG. 6, the overall assembly of the offset oil pump 60, drive gear 80, driven gear 76, oil transfer device 90, and oil dam 105 are shown in their assembled arrangement without mainshaft 22' shown, from the rear of vehicle direction looking forward. Extending radially outward from oil dam 105 and at the end of arm 112, bore 118 can be better seen. Surface 135 and surface 136 on anti-rotation arm 112 will be shown to engage into features formed in rear housing 20' in FIG. 7. These surfaces 135 and 136 may not be necessary in the embodiment having the manifold block 200, with the manifold block 200 providing an anti-rotation feature; however, the surfaces 135 and 136 may still be included to provide additional anti-rotation support to the interconnected components. Turning attention to offset oil pump 60, a plurality of pump mounting fasteners 153 are shown which will be used to mount offset oil pump 60 to rear housing 20' (or to manifold block 200) by threading into corresponding mounting holes. Formed into face 148 of pump housing 62 are pressure chambers of offset oil pump 60. Formed into pump housing 62 on face 148 are low pressure chamber 72c and high pressure chamber 72d. Low pressure chamber 72c will be fluidly connected to receive oil from pressure chamber 72a of rear housing 20' (or of manifold block 200). High pressure chamber 72d will be fluidly connected to transmit oil to pressure chamber 72b in rear housing 20' (or in manifold block 200). As offset pump 60 rotates, pumping action caused by the rotation of inner gerotor ring 64 meshing with outer gerotor ring 66 will bring oil supplied to low pressure chamber 72a/72c into the pump and pressurized fluid will exit the pump into high pressure chamber 72d which is fluidly connected to high pressure chamber 72b formed into the rear housing 20' (or in manifold block 200). A gasket (not shown) will be placed prior to assembly to ensure sealing between face 148 and rear housing 20' (or manifold block 200) to separate and seal low pressure chamber 72a/72c from high pressure chamber 72b/72d.

Figure 7:
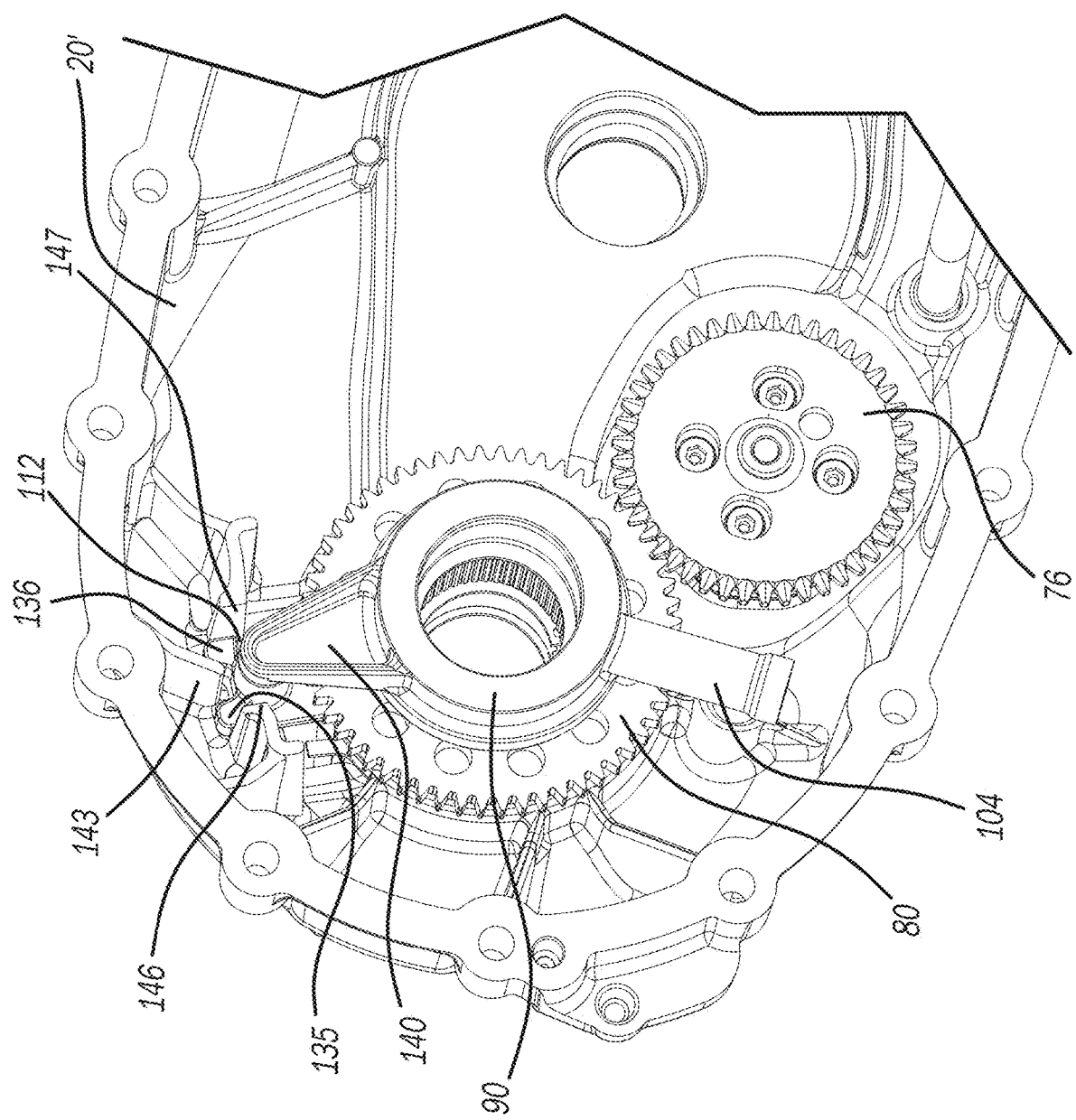
FIG. 7 is an internal view of the transfer case housing showing the oil transfer device and offset oil pump installed, the with the oil dam providing an anti-rotation feature with the rear housing.

Referring to FIG. 7, the overall assembly of the offset oil pump 60, drive gear 80 and driven gear 76, oil transfer device 90, and oil dam 105 are seen assembled into rear housing 20'. A pocket 143 is defined between surface 146 and surface 147 formed in rear housing 20' to receive anti rotation arm 112 of oil dam 105. Positioning anti rotation arm 112 into pocket 143 prevents oil dam 105 from rotating relative to mainshaft 22', as well as providing anti rotation to oil transfer device 90 via their inter connection when assembled. As mainshaft 22' spins counter clockwise in this view, oil dam 105 will have a tendency to also rotate counter clockwise due to drag between oil dam bore surface 155 and drive gear surface 156. Therefore, oil dam surface 135 will move towards pocket surface 146 to take up a small amount of clearance but then stop the ability of the oil dam 105 to rotate further. Similarly, in the opposite direction of mainshaft 22' rotation, oil dam surface 136 will come into contact with pocket surface 147 to block rotation. As described previously, the anti-rotation feature of the embodiment with the manifold block may be provided differently.

Figure 15:
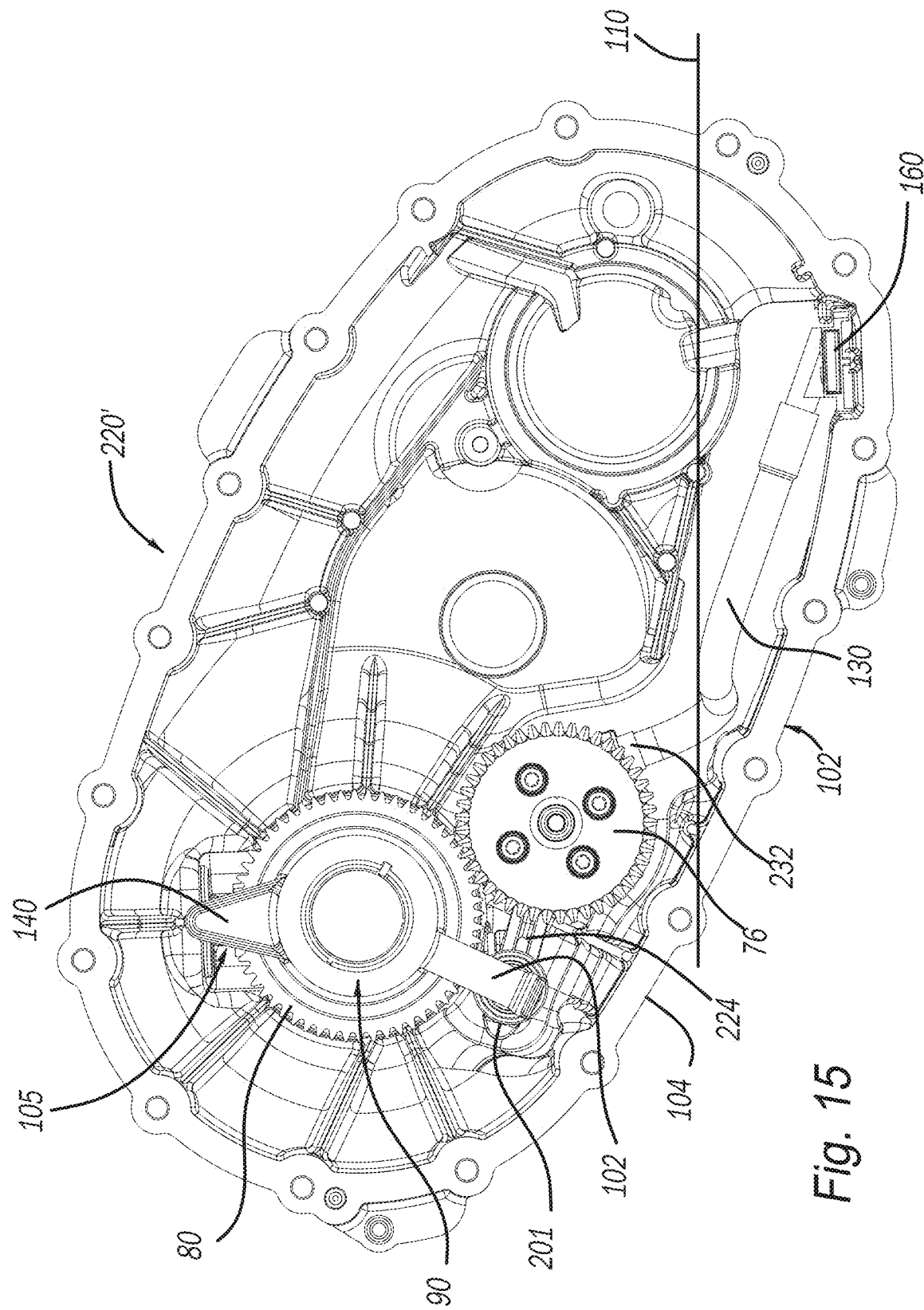
FIG. 15 is an internal view of the rear housing with the manifold block disposed within the rear housing further showing the suction tube installed with the manifold block and the outlet of the manifold block connected to the oil transfer device

The anti-rotation features provided by the manifold block 200 are apparent from FIG. 15. As described previously, the connection between passage 102 and the outlet 201 of manifold block 200 provides an anti-rotation feature to the oil transfer device 90 and also to the oil dam 105. As mainshaft 22' spins counter clockwise in this view, oil dam 105 will have a tendency to also rotate counter clockwise due to drag between oil dam bore surface 155 and drive gear surface 156 (shown in FIG. 6). Such dragging movement will be impeded by the counterforce exerted by the manifold block 200 being put in compression. Similarly, in the opposite direction of mainshaft 22' rotation, corresponding dragging movement would be impeded by the counterforce exerted by the manifold block 200 being put in tension.

Figure 8:
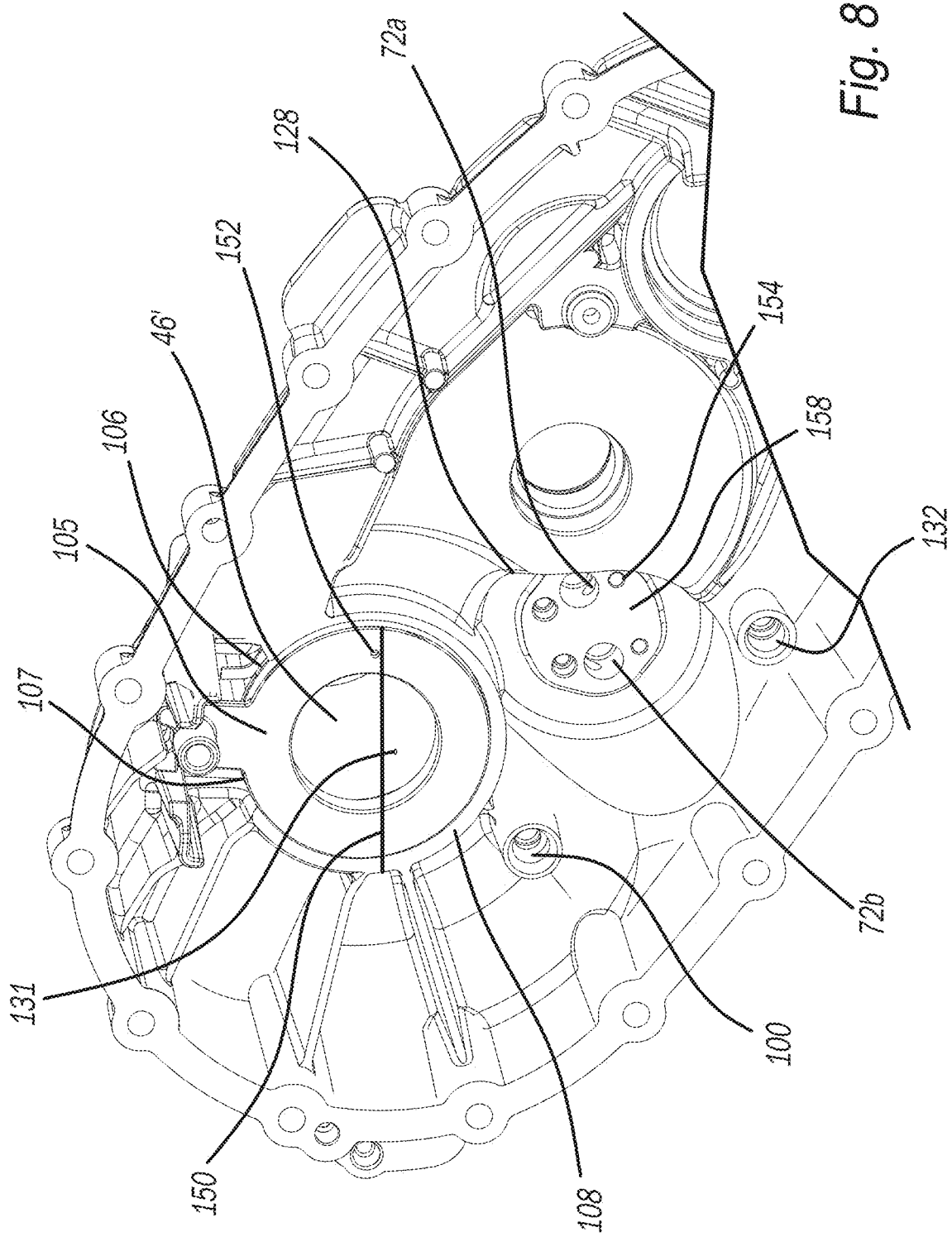
FIG. 8 is an internal view of the transfer case housing showing the oil dam bore for receiving the oil dam, and the integrated oil pump pressure chambers and ports formed in the rear housing for mating with the offset oil pump.

Referring to FIG. 8, an internal view of rear housing 20' is shown with oil dam 105 positioned into place. Oil dam 105 will be installed tightly into bore 108 of rear housing 20'. Sealing ring 107 will provide a seal between bore 108 and outer diameter 106 of oil dam 105, particularly around the bottom half to allow an elevated sump in rear extension cavity 46'. Rear extension metering hole 131 can be seen allowing lubricating oil supplied by offset oil pump 60 to enter the rear extension cavity 46'. Oil in the rear extension cavity 46' can also be supplied by splash lubrication from the transfer case chain. Oil level 150 is allowed to increase until it reaches a relief hole 152 which is a bore through oil dam 105. At this point oil will pass through relief hole 152 and travel into the lower sump. This ensures components in the rear extension cavity 46' including rear bearing 24', rear bushing 52', rear seal 48' and splines 50' of mainshaft 22' are properly lubricated. Relief hole 152 also ensures oil level 150 will remain at a level to optimize function of rear seal 48'. FIG. 8 also illustrates metering hole 131 in the bore that accommodates mainshaft 22'. By metering the amount of oil and utilizing relief hole 152 the metered oil will not exceed half shaft level, which is an advantage prior methods which cause the oil level to run higher than half shaft level and is not ideal for the seal function.

Still referring to FIG. 8, a clear view of the low pressure chamber 72a and high pressure chamber 72b can be seen formed into a housing area 128 of rear housing 20'. Four threaded mounting holes 154 which would receive four pump fasteners 153 are included in mounting face 158. Also, inlet port 132, which receives suction tube 130, and outlet port 100, which receives inlet tube 101 of passage 102, can be seen. In the embodiment having manifold block 200, and apparent from FIG. 15, rear housing 200' includes housing portion 202 to accommodate manifold block 200 therein, with suction tube 130 connecting to manifold block inlet port 232, with fluid ultimately being provided to manifold outlet port 201. Manifold block 200 may include similar structure as mounting face 158, mounting holes 154, and chambers 72a and 72b for interfacing with pump 60 in a similar manner.

Figure 9:
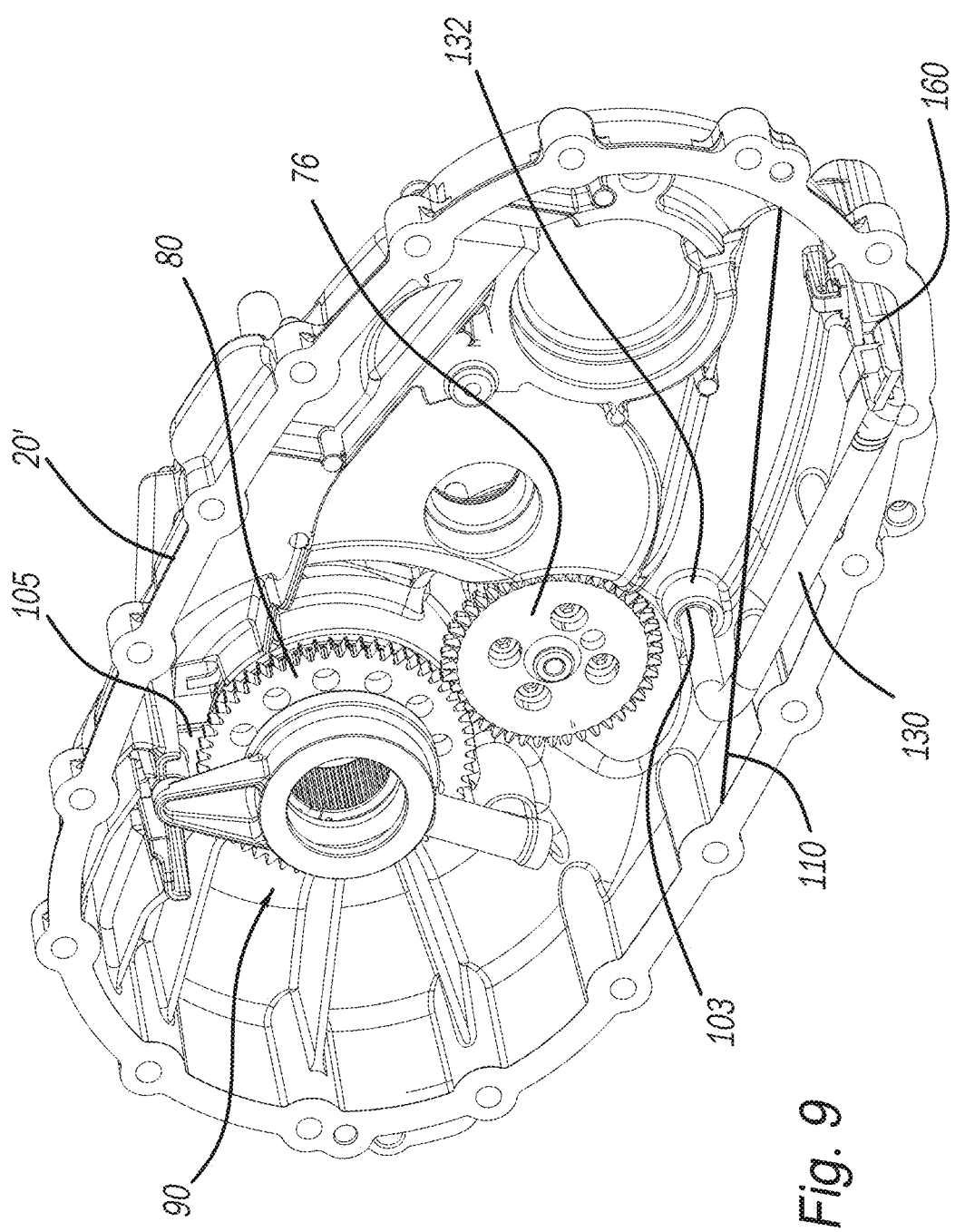
FIG. 9 is an internal view of the transfer case housing further showing the suction tube installed and extending below the oil level of the sump.

Now referring to FIGS. 9 and 15, an inside view of rear housing 20' and rear housing 220', with offset oil pump 60, drive gear 80 and driven gear 76, and oil transfer device 90, are shown. Of particular interest is suction tube 130 with a first end connected to a filter 160 located in the position of the transfer case oil sump that will be below oil level 110. In FIG. 9, at the second end of suction tube 130 is a fitting with o-ring 103 to seal suction tube 130 to inlet port 132 of rear housing 20'. In FIG. 15, the second end of suction tube 130 is a fitting seals to inlet port 232 of manifold block 200. This allows lubricating oil to transfer from the sump, through the filter 160 and suction tube 130, and into the passages 119, 120, 122 integrated into rear housing 20', or into manifold block 200, and eventually to offset oil pump 60.

Figure 10A:
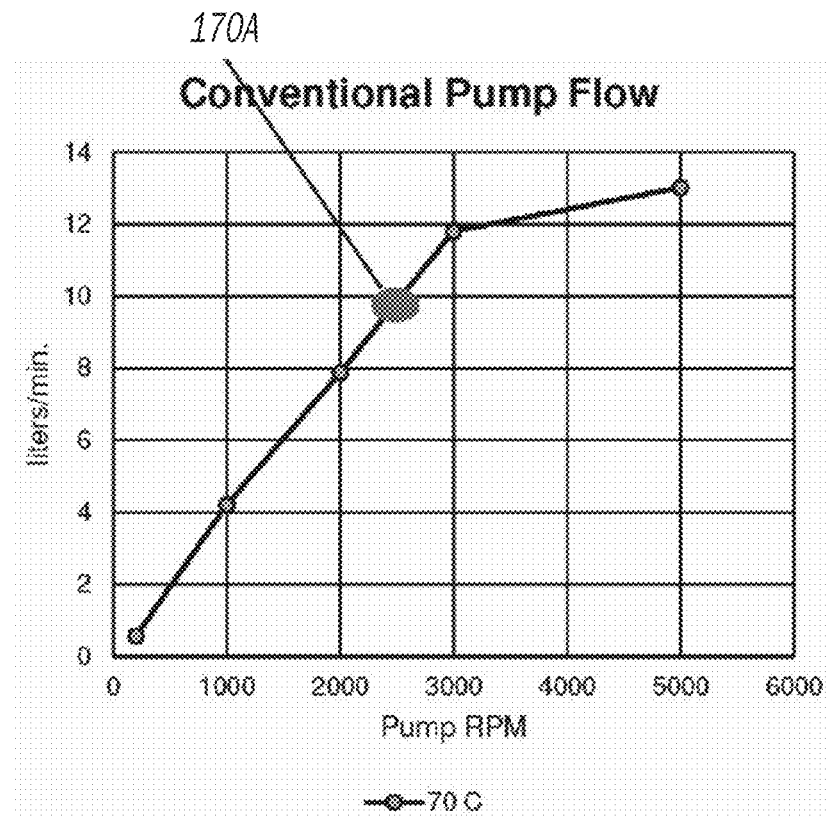
FIGS. 10A and 10B are graphs showing pump flow and power loss from the conventional concentrically mounted pump at various rotational speeds.
Figure 10B:
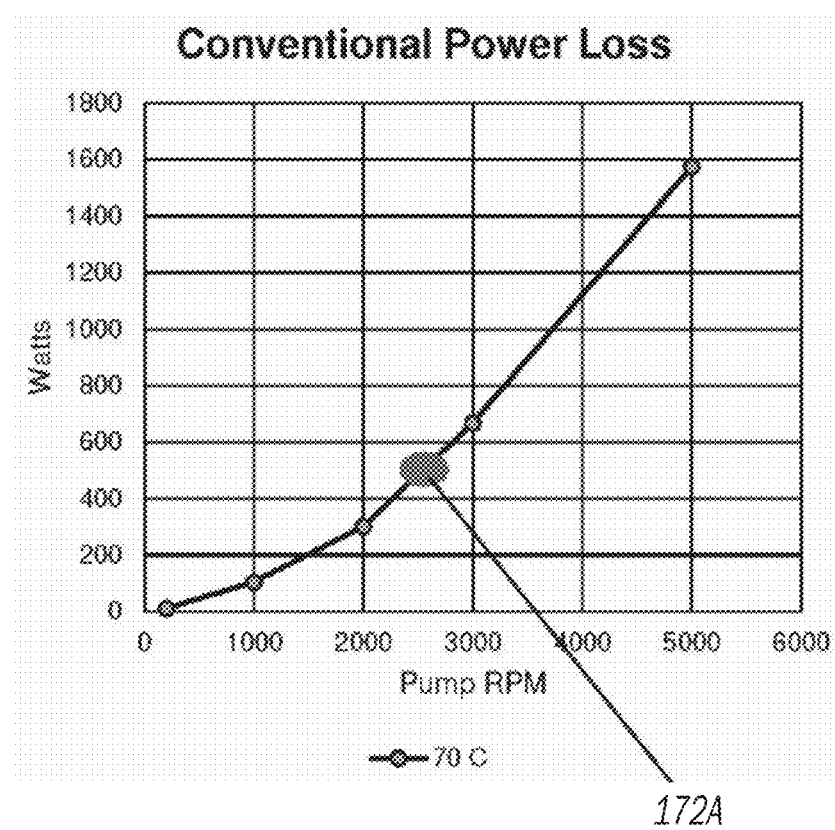

Referring to FIGS. 10A and 10B, a pump flow curve for a conventional coaxially mainshaft mounted pump 26 is shown in FIG. 10A. The curve shows pump flow (L/min) at various pump RPMs. As this pump is driven directly by the mainshaft 22, pump speed (RPM) will equal mainshaft speed. A vehicle operating condition at 70 MPH is chosen equating to 2500 RPM pump speed. At 2500 RPM, testing has shown the conventional pump outputs 10 L/min based on data point 170A. Knowing the pump is rotating at 2500 RPM, the test results of power loss measured in watts based on a particular pump back pressure results in approximately 500 watts based on data point 172A. Therefore, offset oil pump 60 of the present disclosure may be designed to produce approximately 10 L/min when mainshaft speed is 2500 RPM.

Figure 11A:
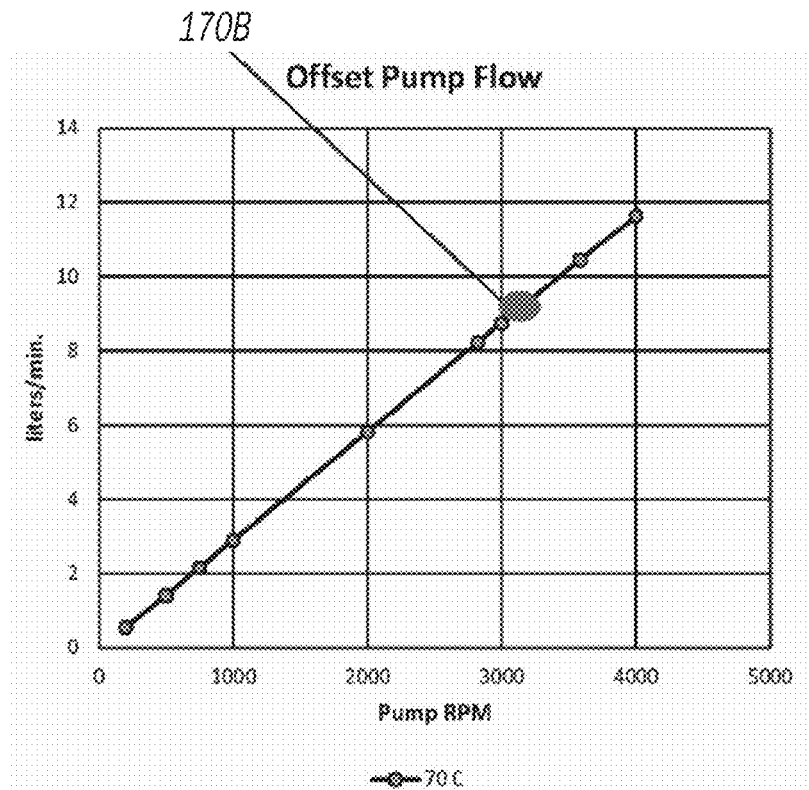
FIGS. 11A and 11B are graphs showing pump flow and power loss from the offset mounted pump at various rotational speeds of the present invention.
Figure 11B:
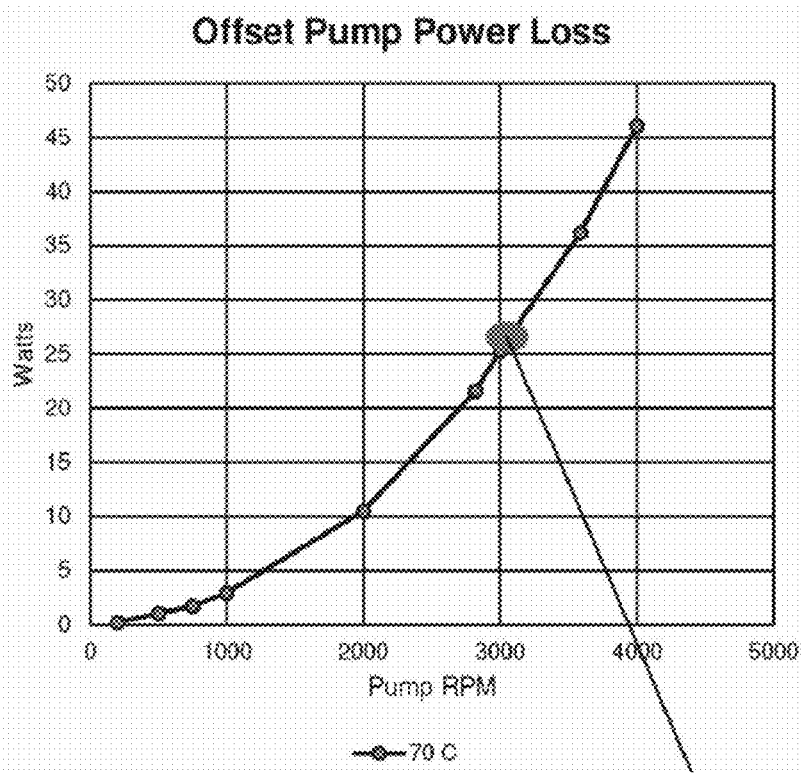

Referring to FIGS. 11A and 11B, pump flow curves for offset pump 60 of the present disclosure are shown based on rotation speed of pump shaft 74. Therefore, due to the ratio (R1/R2) there is a speed difference between pump shaft 74 and mainshaft 22'. In this particular design the ratio is 1.24:1, which results in an increased pump speed based on a given mainshaft speed and determined based on achieving the same flow as prior coaxial conventional pump 26. This ratio can be adjusted depending on operational requirements and pump characteristics to achieve an optimized arrangement, but in this particular example at 70 MPH and a mainshaft speed of 2500 RPM, pump shaft 74 will be rotating at 3100 RPM providing a similar pump flow (data point 170B) as prior conventional pump 26, but with a greatly reduced power loss of 25 watts (data point 172B). This will result in less power loss to the overall vehicle driveline across the vehicle speed range and improving fuel economy. If development indicates less lubrication flow is required, adjusting the ratio between drive gear 80 and driven gear 76 is an easy and economical change to improve power losses while utilizing the same offset oil pump 60.

Referring now to FIGS. 16-23, an additional embodiment of the present disclosure is provided. Various aspects of the above disclosure are equally applicable to this additional embodiment, unless otherwise noted.

Figure 16:
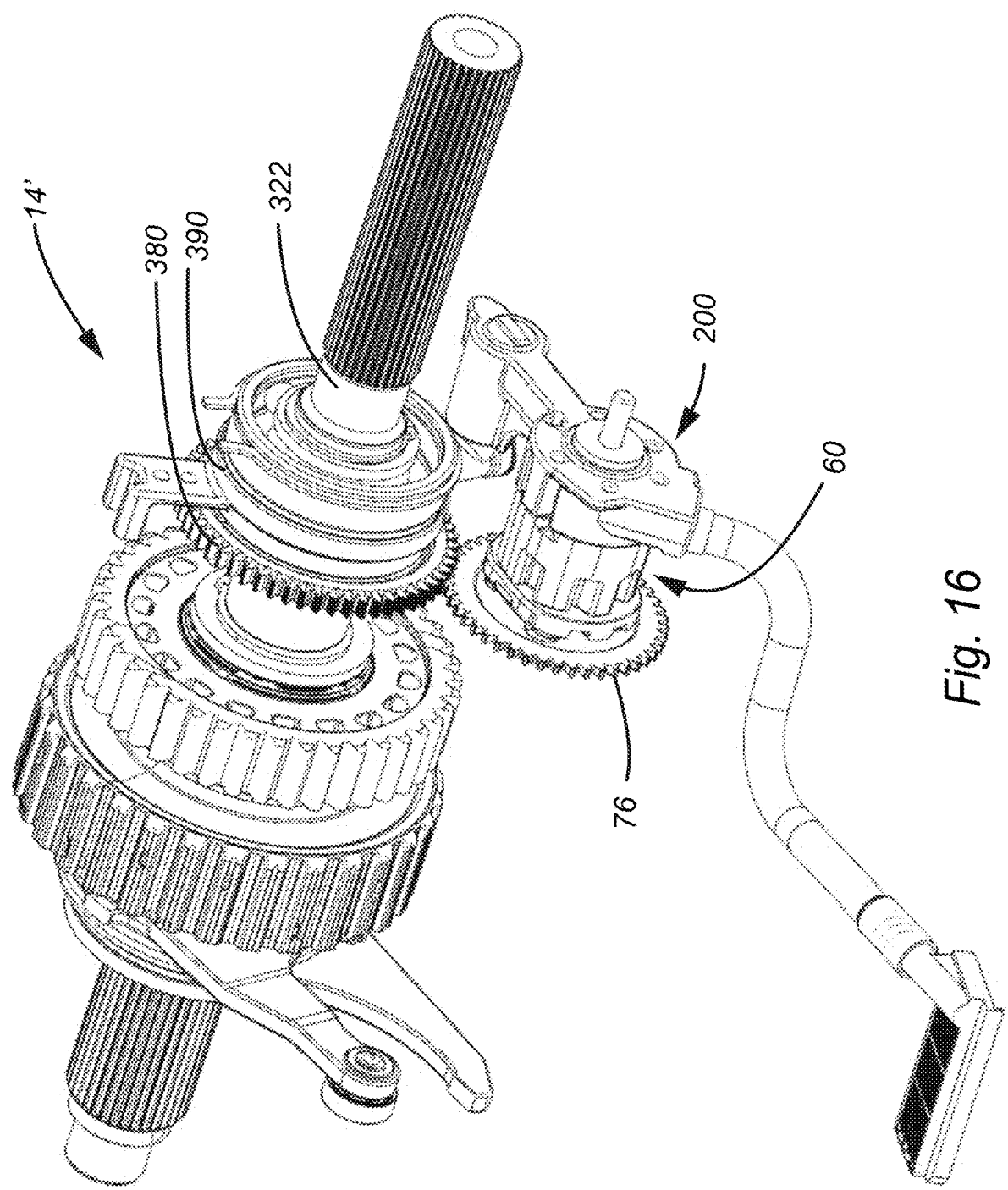
FIG. 16 is a perspective view of an additional embodiment of a transfer case arrangement according to the present disclosure.
Figure 17:
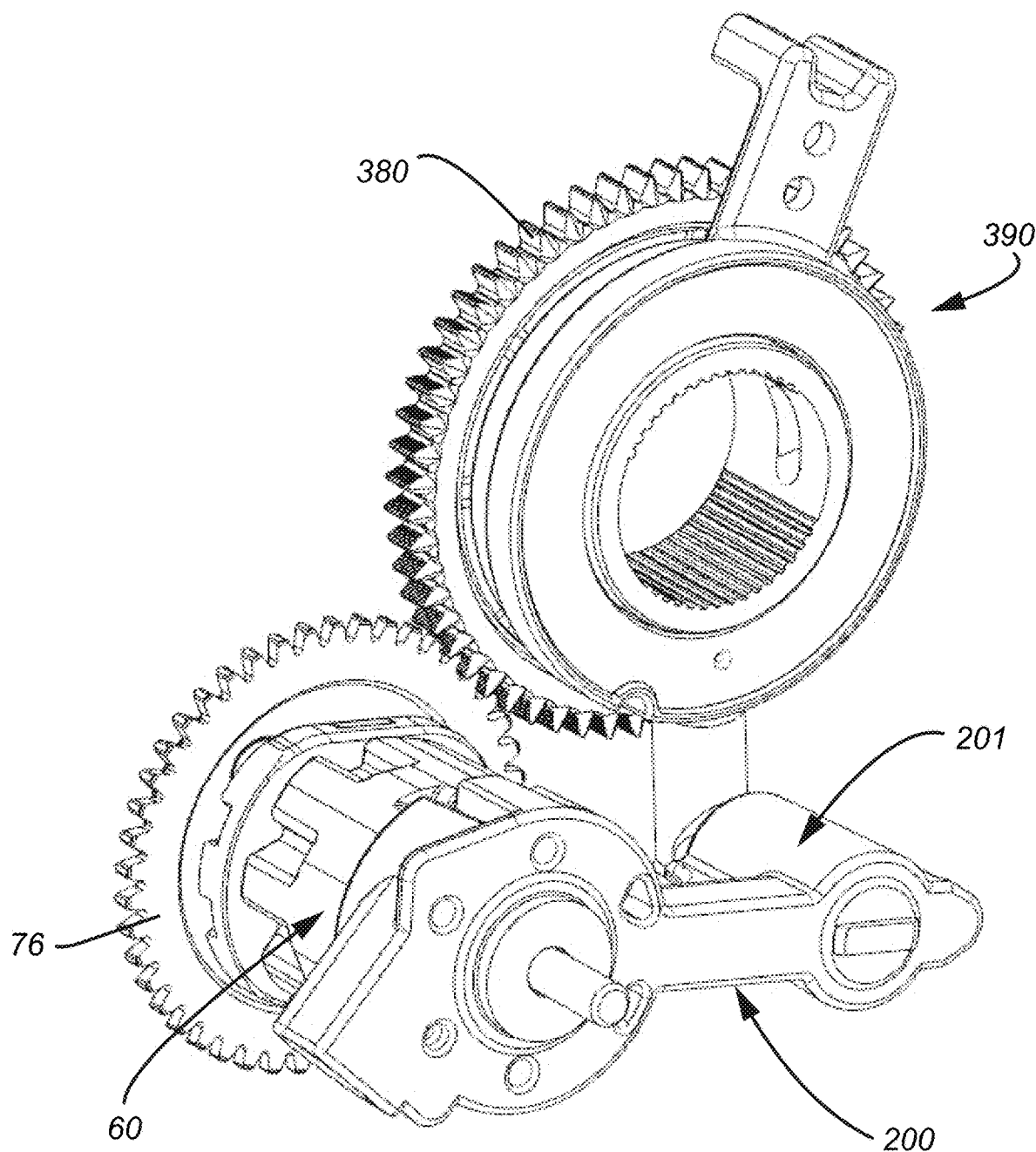
FIG. 17 is a partial perspective view of the embodiment of FIG. 16 illustrating a rear side of a combined oil device.
Figure 18:
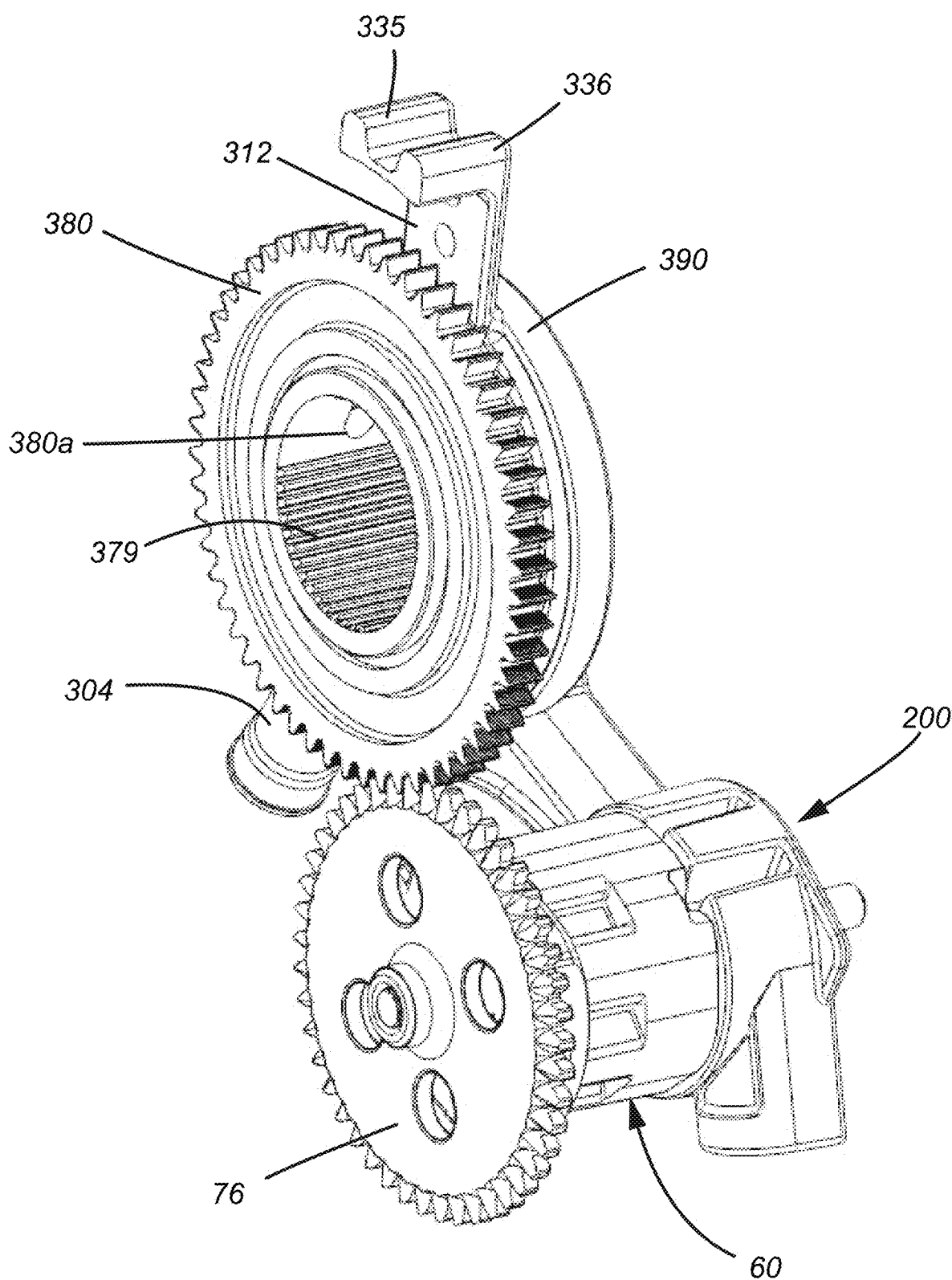
FIG. 18 is an another partial perspective view of the embodiment of FIG. 16 illustrating the front side.

With reference to FIG. 16, a modified transfer case 14' arrangement is provided that includes a combined oil transfer device and oil dam, which may be referred to as a combined oil device 390. Unlike the oil transfer device 90 and oil dam 105, the combined oil device 390 is disposed on a single axial side of the toothed portion of drive gear 380. Drive gear 380 operates similarly to drive gear 80, with slight modifications to the associated oil passageways, as described in further detail below.

The modified transfer case 14' also includes a slightly modified oil path from the above-described sump arrangement. The rear extension passage 126 and metered passage 131 are not present.

Figure 19:
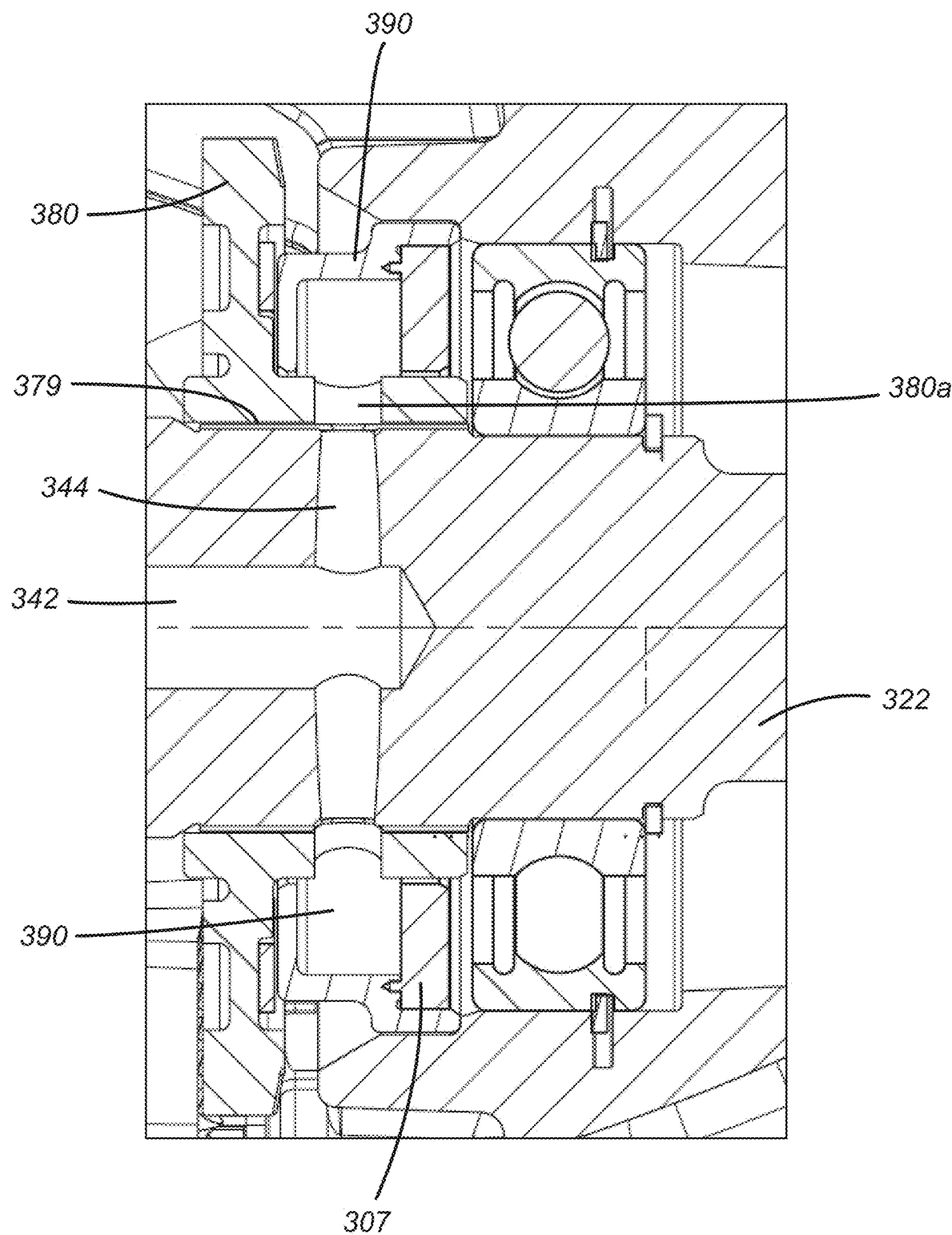
FIG. 19 is a cross-sectional detail view of the combined oil device installed within the transfer case arrangement of FIG. 16, with a rear extension cavity extending rearward to the right from the combined oil device.

With reference to FIG. 19, in addition to the combined oil device 390 and drive gear 380, a modified mainshaft 322 is also provided, having an oil inlet 344 and a central passage 342 that differ from those of mainshaft 22' (See FIG. 2). The central passage 342 now extends further into the mainshaft 322 to receive the oil being provided by the combined oil device 390, which is on the opposite side of the drive gear 380 (compared to the position of the oil transfer device 90 relative to the drive gear 80 of the embodiment of FIG. 2). The oil inlet 344 extends radially outward from the central passage 342 at an axial location corresponding to the axial position of the combined oil device 390.

The oil device 390 is disposed radially outward from the flange portion of the drive gear 380 that is rotationally fixed and splined to the mainshaft 322 at spline connection 379. Accordingly, the drive gear 380 includes slots, holes, or passageways 380a that are sized and arranged to overly the openings defined by the oil inlets 344 that are formed in the mainshaft 322.

The flange portion of drive gear 80 does not include the passageways, because oil is not provided into the mainshaft at that location in the embodiment of FIG. 2.

The mainshaft 322 and drive gear 380 rotate together, relative to the combined oil device 390 that remains rotationally fixed. The combined oil device 390 remains rotationally fixed in the same manner as oil dam 105. For instance, combined oil device 390 includes ears or surfaces 335 and 336 on anti-rotation arm 312, with the surfaces 335 and 336 engaging with a feature of the housing, as described with reference to arm 112 and surfaces 135 and 136.

Oil from the sump is provided into annular chamber 396 of the combined oil device, similar to the arrangement of annular chamber 96 and oil transfer device 90. The oil in the annular chamber 396 surrounds the rotating flange portion of the drive gear 380 (and the associated passageways 380a) that rotates along with the mainshaft 322, such that oil is received in the central passage 342.

The combined oil device 390 may include sealing ring 307, disposed around the annular chamber 396, which retains the oil within the chamber 396 and also seals the opening of the rear housing portion. The sealing ring 307 therefore provides features similar to those of cover 94 (which encloses the annular chamber) and sealing ring 107. The sealing ring 307 may include a small hole 307a (FIG. 20) for metering oil into the rear housing cavity and toward the bearings (axially adjacent the combined oil device 390) that support the mainshaft 322.

Figure 20:
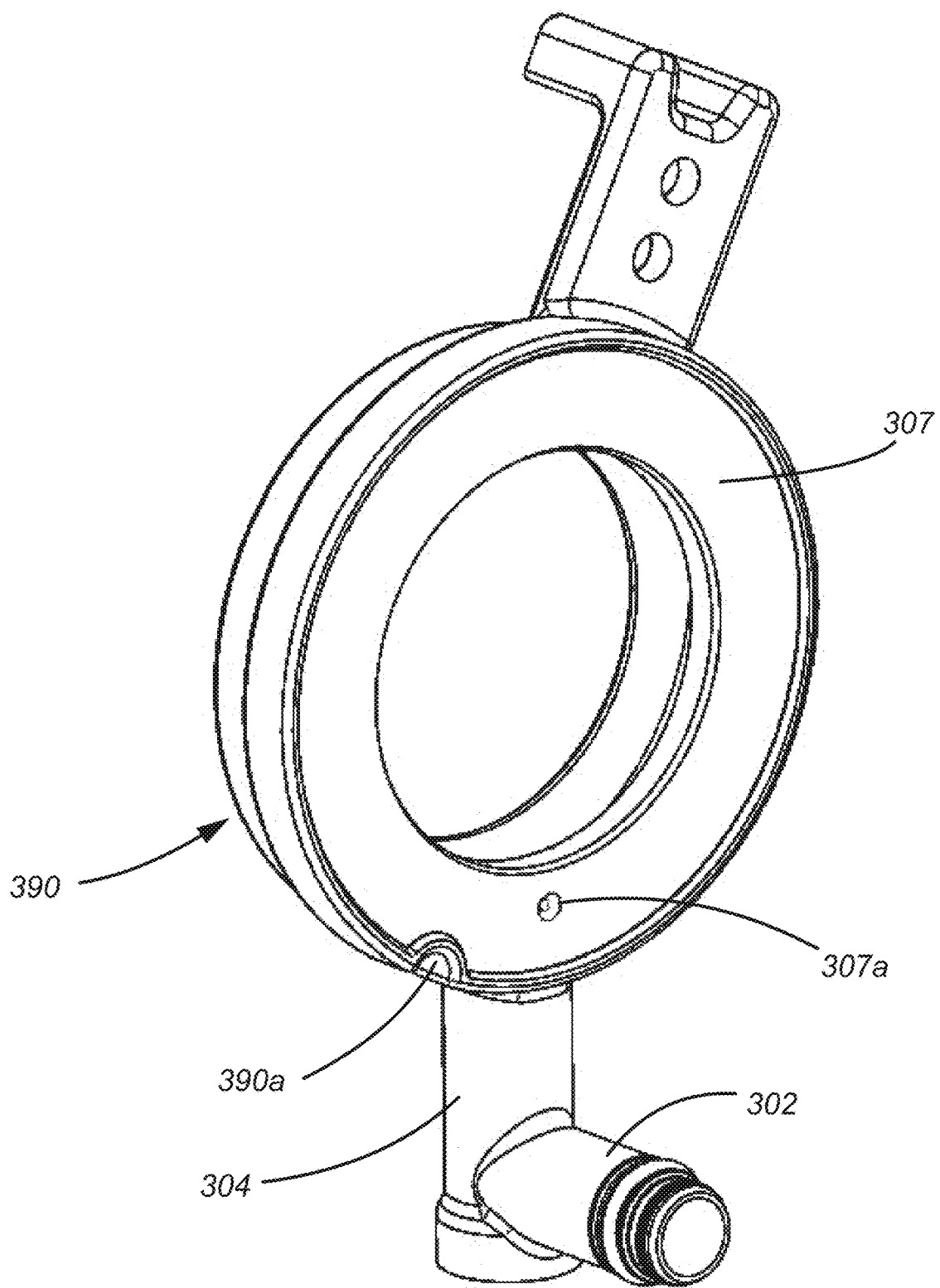
FIG. 20 is a rear perspective view of the combined oil device.
Figure 21:
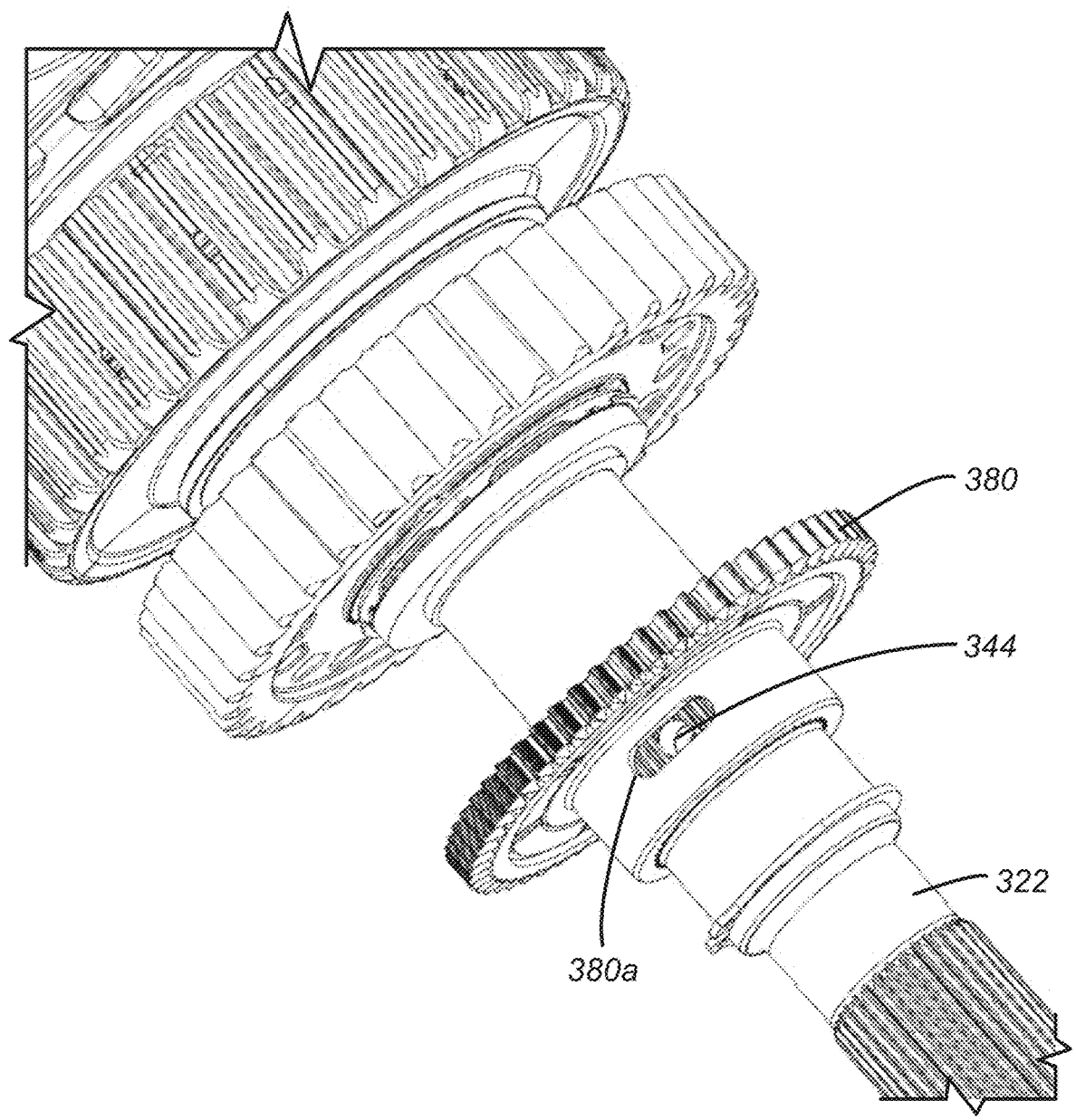
FIG. 21 is a perspective view of a drive gear for use with the combined oil device and installed on the mainshaft and including an opening in a flange portion of the drive gear for providing oil into the oil inlets of the mainshaft.
Figure 22:
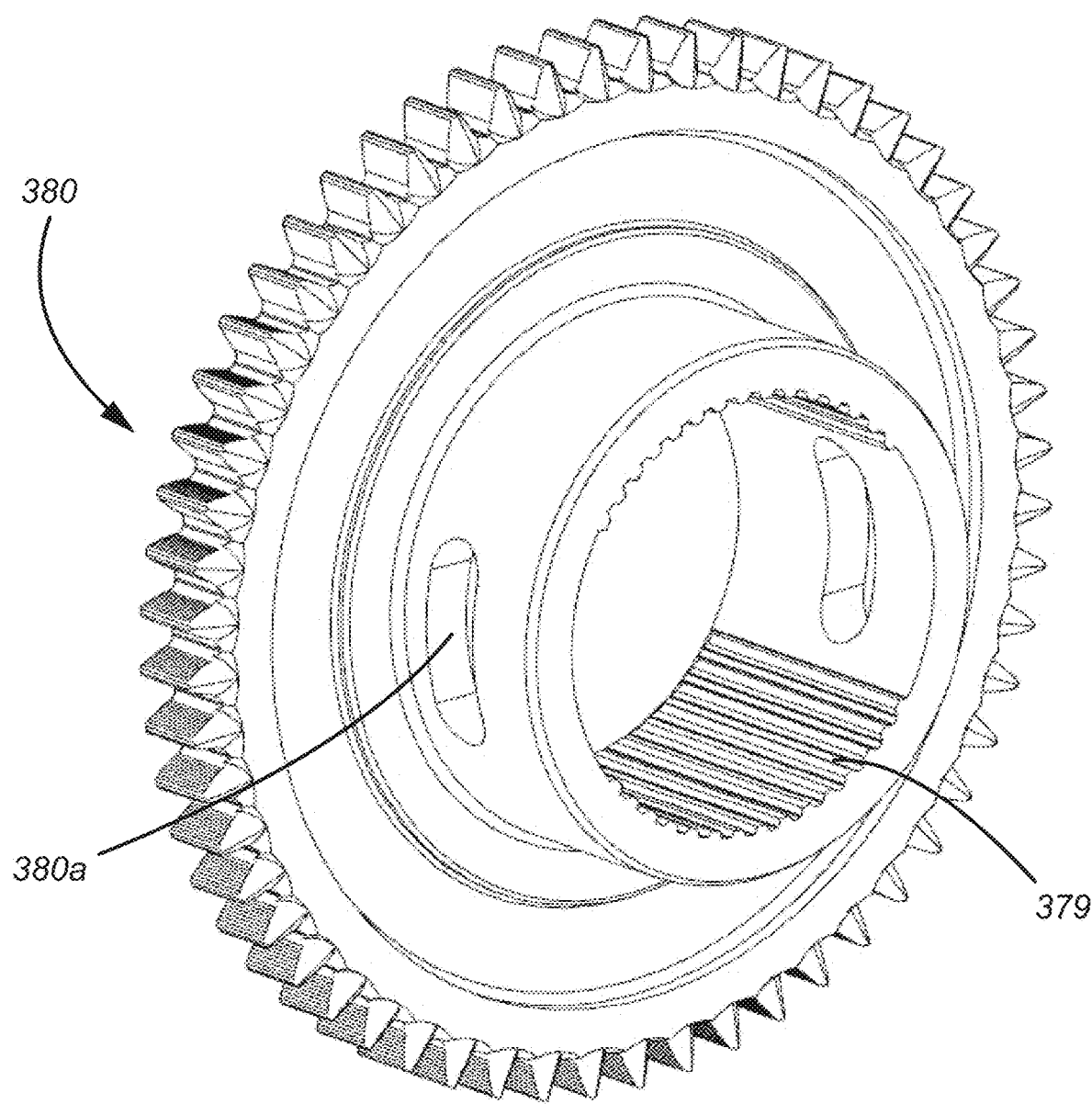
FIG. 22 is a rear perspective view of the drive gear.
Figure 23:
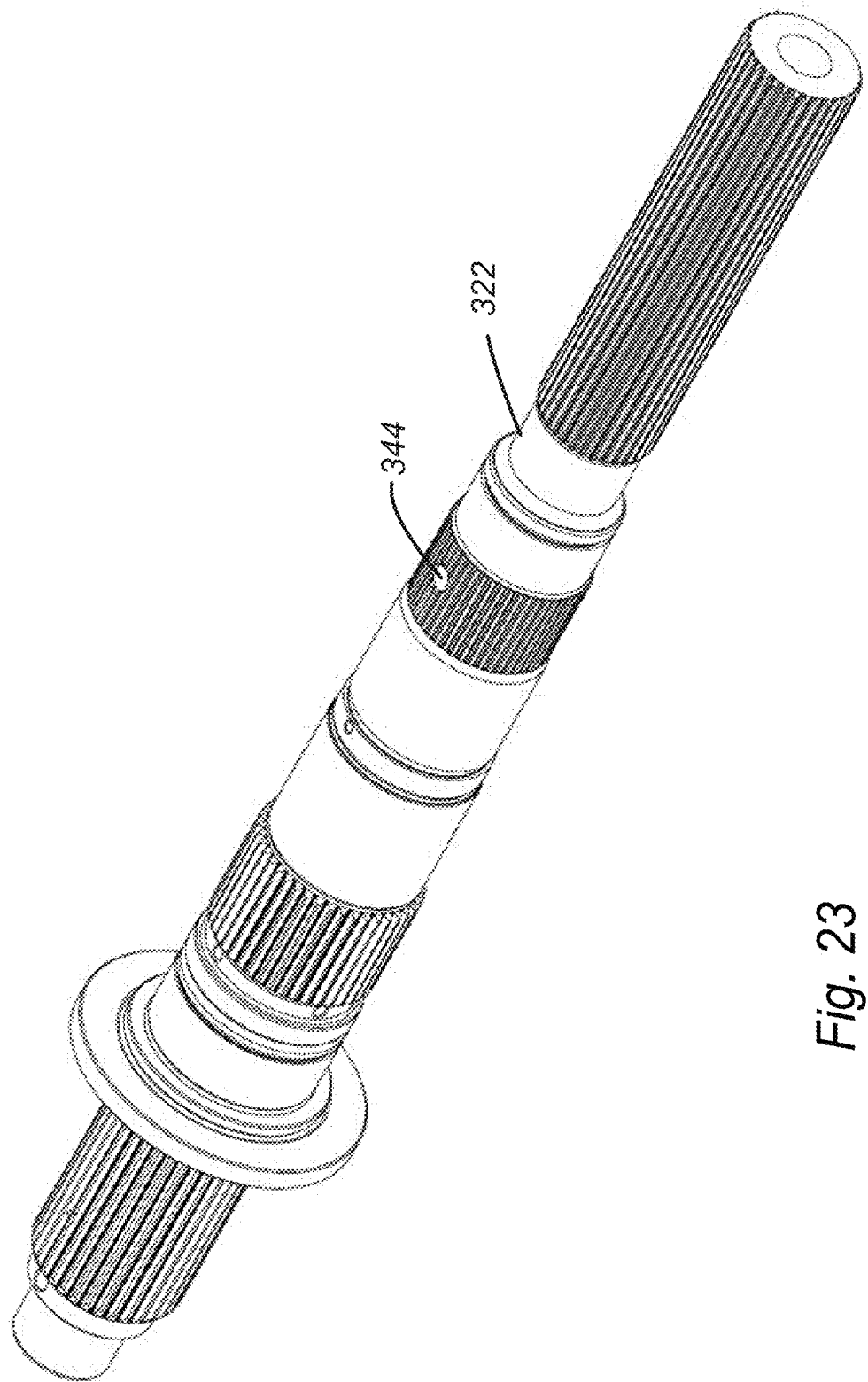
FIG. 23 is a perspective view of the mainshaft.

Additionally, as shown in FIG. 20, the combined oil device 390 may include a drain feature 390a, in the form of an indentation extending into the outer profile of the device 390. The drain feature 390a provides a passageway from the rear extension of the housing toward the main sump, so that oil that is provided to the rear extension cavity via the metering hole 307a does not overly build up. As the oil accumulates in the rear extension, the oil will proceed to drain back to the main housing via the drain feature 390. It will be appreciated that the rear extension cavity is accordingly not fully "sealed" in that there is a drain path, as well as the sealing ring 307 that delimits the annular chamber 396 from the rear extension cavity including the metering hole 307a. The combined oil device 390 therefore still acts as an oil dam or oil separator between the annular chamber 396, which transfers the oil from the sump to the central passage of the mainshaft 322, and the rear extension cavity, which includes the bearings that support the mainshaft 322, with the metering hole 307a providing oil to the rear extension cavity in a controlled manner, such that the majority of oil flows into the central passage of the mainshaft 322.

The modified transfer case 14' accordingly has fewer surfaces where relative rotation occurs, by eliminating the bearing surface between the oil transfer device 90 and the mainshaft 22' of the embodiment of FIG. 2. In the modified transfer case 14', the bearing surface of the combined oil device 390 against the flange of drive gear 380 is similar to the single bearing surface between the drive gear 80 and the oil dam 105.

Thus, the number of overall components is reduced relative to the embodiment of FIG. 2. The reduction in components reduces overall weight and cost. The reduction in components, by combining two components into one, likewise reduces assembly complexity, without any apparent performance loss. By reducing weight, energy usage is decreased, thereby reducing carbon dioxide.

The operation of the modified transfer case 14' is similar to that of offset transfer case 14, described above. The offset oil pump assembly 60 and the various oil passageways may still be used. The pump assembly 60 may be activated by driven gear 76 (which is driven by the rotation of drive gear 380 that rotates with mainshaft 322). Oil pump assembly 60 may be mounted to manifold block 200, as in the embodiment of FIG. 2. The manifold 200 of modified transfer case 14' may differ slightly, in that the rear cavity feed plug 225 may be excluded. Metered oil may instead be provided to the rear extension cavity via the hole 307a.

Oil that is pumped into manifold 200 is directed through outlet tube 201. Outlet tube 201 receives axially extending passage 302. Passage 302 is part of the combined oil device 390, similar to passage 102 of oil transfer device 90. Passage 302 is connected to radially extending passage 304 (similar to passage 104). Passage 304 is located at a different axial location relative to passage 104. Passage 302 does not need to extend axially as far as passage 102, because the combined oil device 390 is disposed axially closer to the manifold 200 than the oil transfer device 90 of the FIG. 2 embodiment. Thus, the passage 304 is axially aligned with the combined oil device 390 at the same axial side relative to the drive gear 380. The passage 304 may be in a common axial location relative to the pump assembly 60, which is on the same axial side as the combined oil device 390 relative to the dive gear 380 and driven gear 76.

The passage 302 being received in the outlet tube 201 also provides an anti-rotation effect to the combined oil device 390. The manifold 200 is fixed relative to the housing, and therefore the axially extending tube 201 is also fixed. Thus, rotational forces imparted on the combined oil device 390 during rotation of the mainshaft 322 and the drive gear 380 may be counteracted by the manifold 200, as well as the via the arm 312 that engages the housing.

Assembly of the manifold block 200 with the combined oil device 390 is more easily performed relative to the embodiment of FIG. 2. In particular, the sleeve 200c may be excluded. The sleeve 200c is used in the prior embodiment because the oil transfer device 90 is assembled at a different stage relative to the manifold block and the oil dam 105. The flared end of sleeve 200c assists in the "blind" assembly that occurs to guide the passage 102 into outlet tube 201. In the modified transfer case 14', the outlet tube 201 is shorter and mates with the passage 302 of the combined oil device 390 on the same axial side as the drive gear 380. Thus the assembly is simplified, and he "blind" assembly may be avoided.

While the above design has been described with reference to the manifold block 200, it will be appreciated that the combined oil device 390 and its associated features may also be used with the embodiment of the rear housing having the oil passageways formed therein, rather than using the manifold block to provide the oil passages from the pump assembly 60.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A transfer case lubrication system comprising:
   a mainshaft transmitting torque through a driveline;
   a lubricating pump having a pumpshaft having an axis positioned offset relative to a rotational axis of the mainshaft to define an offset lubricating pump;
   wherein the offset lubricating pump is driven by a geartrain transferring power from the mainshaft;
   wherein the offset lubricating pump delivers pressurized lubrication fluid from a sump defined within the transfer case to the mainshaft, the pressurized lubrication fluid delivered via a plurality of passageways coupled to a combined oil device that supplies the pressurized lubrication fluid to the mainshaft and delimits a rear extension of a rear housing of the transfer case;
   wherein the mainshaft includes a drive gear rotationally fixed thereto that drive the pump;
   wherein an annular chamber of the combined oil device is axially aligned with a flange portion of the drive gear and surrounds the flange portion, wherein the flange portion includes at least one opening overlying an oil inlet extending into the mainshaft and in fluid communication with a central passage of the mainshaft, such that fluid is provided from the annular chamber into the mainshaft when the mainshaft and drive gear rotate together.

2. The transfer case lubrication system of claim 1, further comprising a manifold block fixed to the rear housing of the transfer case, wherein the manifold block includes the plurality of passageways.

3. The transfer case lubrication system of claim 1, wherein the lubricating pump includes a driven gear attached to the pumpshaft, wherein the drive gear drives the driven gear.

4. The transfer case lubrication system of claim 3, wherein the combined oil device surrounds the mainshaft and is disposed axially rearward relative to the drive gear.

5. The transfer case lubrication system of claim 4, wherein the combined oil device includes the annular chamber in fluid communication with the pump and in fluid communication with a central passage of the mainshaft.

6. The transfer case lubrication system of claim 3, wherein the pump is disposed axially rearward from the driven gear, wherein the pumpshaft is connected to an inner gerotor, wherein the inner gerotor is meshed with an outer gerotor, wherein the outer gerotor surrounds the inner gerotor, and the outer and inner gerotor do not surround the mainshaft.

7. The transfer case lubrication system of claim 3, wherein the pump is disposed axially rearward from the driven gear.

8. The transfer case lubrication system of claim 1, wherein the combined oil device includes an oil dam in engagement with the rear housing, wherein the oil dam maintains a further sump in the rear extension cavity.

9. The transfer case lubrication system of claim 1, wherein the combined oil device includes an annular sealing ring that delimits the annular chamber and separates the annular chamber from the rear extension cavity.

10. The transfer case lubrication system of claim 9, wherein the sealing ring includes a hole that provides metered fluid communication from the annular chamber to the rear extension cavity.

11. The transfer case lubrication system of claim 1, wherein the at least one opening is in the form of a circumferential slot, wherein the oil inlet has a circumferential extent that is smaller than that of the slot.

12. The transfer case lubrication system of claim 1, wherein the plurality of passageways provide the pressurized lubrication fluid to the combined oil device as well as the rear extension cavity, wherein fluid is delivered to the rear extension cavity in a metered manner from the combined oil device such that the majority of lubrication fluid is delivered to the annular chamber of the combined oil device and to the central passage.

13. The transfer case lubrication system of claim 1, wherein the combined oil device is braced against rotation relative to the transfer case, wherein the mainshaft and drive gear are rotatable relative to the combined oil device.

14. The transfer case lubrication system of claim 1, wherein the combined oil device includes a radially extending passage extending from a central housing portion of the oil distribution device and an axially extending passage extending from the radially extending passage, the axially extending passage connected to an outlet port of the plurality of passageways.

15. The transfer case lubrication system of claim 1, wherein the pump includes a pump housing radially offset from the mainshaft and defining pressure chambers therein.

16. The transfer case lubrication system of claim 1, wherein the pump includes a suction port attached to the sump and receives lubrication fluid from the sump at a location radially offset from the mainshaft, wherein the pump pressurizes the fluid and delivers the pressurized fluid, via a delivery port into the plurality of passageways, from the radially offset location to the oil distribution device for delivery into the mainshaft.

17. A transfer case lubrication system comprising:
   a mainshaft transmitting torque through a driveline;

a lubricating pump having a pumpshaft having an axis positioned offset relative to a rotational axis of the mainshaft to define an offset lubricating pump;

wherein the offset lubricating pump is driven by a geartrain transferring power from the mainshaft;

wherein the offset lubricating pump delivers pressurized lubrication fluid from a sump defined within the transfer case to the mainshaft, the pressurized lubrication fluid delivered via a plurality of passageways coupled to a combined oil device that supplies the pressurized lubrication fluid to the mainshaft and delimits a rear extension of a rear housing of the transfer case;

wherein the mainshaft includes a drive gear rotationally fixed thereto and the lubricating pump includes a driven gear attached to the pumpshaft;

wherein the combined oil device surrounds the mainshaft and is disposed axially rearward relative to the drive gear, and the pump is disposed axially rearward from the driven gear;

wherein the combined oil device includes an annular chamber in fluid communication with the pump and in fluid communication with a central passage of the mainshaft;

wherein the combined oil device axially overlaps a flange portion of the drive gear and is disposed radially outward from the flange portion.

18. A transfer case lubrication system comprising:

a mainshaft transmitting torque through a driveline;

an offset pump having a pumpshaft with an axis positioned offset relative to a rotational axis of the mainshaft, wherein the offset pump draws lubricating fluid from a sump defined in the transfer case and provides pressurized fluid to the mainshaft;

a manifold block fixed to a rear housing of the transfer case, wherein the manifold block includes a plurality of passageways therethrough;

a drive gear rotationally fixed to the mainshaft that rotates with the mainshaft, the drive gear in engagement with a driven gear that drives the offset pump;

a combined oil device axially adjacent the drive gear and surrounding the mainshaft, and which supplies pressurized lubrication fluid from the offset pump to the mainshaft;

wherein the offset pump includes a suction port coupled to the manifold block and a delivery port coupled to the manifold block, wherein the offset pump draws lubrication fluid from the sump via the manifold block, pressurizes the lubrication fluid, and delivers pressurized fluid to the combined oil device via the plurality of passageways of the manifold block;

wherein the manifold block includes an inlet port attached to a suction tube extending into the sump, the manifold block includes an outlet port that is fluidly and sealing connected to an inlet tube of the combined oil device, wherein the outlet port of the manifold block and the inlet tube of the combined oil device provides an anti-rotation feature for the combined oil device in response to drag caused by rotation of the mainshaft relative to the combined oil device.

19. The transfer case lubrication system of claim 18, wherein the combined oil device provides an oil dam surrounding the mainshaft, wherein the oil dam isolates a rear extension of the transfer case, wherein the oil dam includes a sealing ring that delimits an annular chamber of the combined oil device in which the pressurized fluid is received from the pump.

20. The transfer case lubrication system of claim 19, wherein the combined oil device is disposed axially between the drive gear and the rear extension of the transfer case, wherein the annular chamber is axially aligned with a flange portion of the drive gear and surrounds the flange portion, wherein the flange portion includes at least one opening overlying an oil inlet extending into the mainshaft and in fluid communication with a central passage of the mainshaft, such that fluid is provided from the annular chamber into the mainshaft when the mainshaft and drive gear rotate together, wherein the flange portion includes an outer surface that bears against an inner surface of the combined oil device during rotation.

* * * * *